US012793544B2

(12) United States Patent
Shigematsu et al.

(10) Patent No.: US 12,793,544 B2
(45) Date of Patent: Nov. 10, 2026

(54) SIGNAL PROCESSING APPARATUS, SIGNAL PROCESSING METHOD, AND RECORDING MEDIUM

(71) Applicants: SONY SEMICONDUCTOR SOLUTIONS CORPORATION, Kanagawa (JP); SONY GROUP CORPORATION, Tokyo (JP)

(72) Inventors: Kazuma Shigematsu, Kanagawa (JP); Yasuhiro Yukawa, Tokyo (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 62 days.

(21) Appl. No.: 18/843,650

(22) PCT Filed: Feb. 24, 2023

(86) PCT No.: PCT/JP2023/006626

§ 371 (c)(1),
(2) Date: Sep. 3, 2024

(87) PCT Pub. No.: WO2023/171401

PCT Pub. Date: Sep. 14, 2023

(65) Prior Publication Data

US 2025/0225866 A1 Jul. 10, 2025

(30) Foreign Application Priority Data

Mar. 11, 2022 (JP) ................................. 2022-038485

(51) Int. Cl.

| | |
|---|---|
| ***G08G 1/09*** | (2006.01) |
| ***B60W 30/06*** | (2006.01) |
| ***G08G 1/0962*** | (2006.01) |

(52) U.S. Cl.
CPC ........... *G08G 1/0962* (2013.01); *B60W 30/06* (2013.01)

(58) Field of Classification Search
CPC .......... G08G 1/0962; G08G 1/09; G08G 1/14; G08G 1/143; G08G 1/16; B60W 30/06; B60W 2540/215; B60W 50/14
See application file for complete search history.

(56) References Cited

U.S. PATENT DOCUMENTS

2017/0092130 A1* 3/2017 Bostick .................. G08G 1/015
2018/0099661 A1* 4/2018 Bae ....................... B60W 30/06
(Continued)

FOREIGN PATENT DOCUMENTS

JP 2014-125195 A 7/2014
JP 2016-076029 A 5/2016
(Continued)

OTHER PUBLICATIONS

International Search Report and Written Opinion of PCT Application No. PCT/JP2023/006626, issued on May 16, 2023, 18 pages of ISRWO.

*Primary Examiner* — Travis R Hunnings
*Assistant Examiner* — Sharmin Akhter
(74) *Attorney, Agent, or Firm* — XSENSUS LLP

(57) ABSTRACT

The present technology relates to a signal processing apparatus, a signal processing method, and a recording medium that make it possible to propose an appropriate parking position in a free space. A signal processing apparatus of the present technology includes a candidate setting section that sets multiple stop position candidates as candidates of a stop position of a moving body in a free space around a subject moving body on the basis of free space information related to the free space, and a choosing section that chooses a recommended stop position recommended as the stop position of the subject moving body from the multiple stop
(Continued)

position candidates. In addition, the signal processing apparatus further includes a presentation control section that presents, to a user, at least either the multiple stop position candidates or the recommended stop position in the free space. For example, the present technology can be applied to a vehicle that performs automated parking.

18 Claims, 21 Drawing Sheets

(56) References Cited

U.S. PATENT DOCUMENTS

| | | | | |
|---|---|---|---|---|
| 2018/0315312 | A1* | 11/2018 | Hayakawa | G08G 1/14 |
| 2021/0300337 | A1* | 9/2021 | Fujitani | G08G 1/143 |

FOREIGN PATENT DOCUMENTS

| | | | |
|---|---|---|---|
| JP | 2019-043429 | A | 3/2019 |
| JP | 2021-094940 | A | 6/2021 |
| JP | 2021-151815 | A | 9/2021 |
| WO | 2017/187592 | A1 | 11/2017 |
| WO | 2019/008764 | A1 | 1/2019 |

* cited by examiner

FIG. 14

PREFERENCE INFORMATION

- MAKE SPACE ON SIDE OF DRIVER'S SEAT LARGER THAN SPACE ON SIDE OF PASSENGER SEAT (WHILE SPACES FOR BOARDING AND ALIGHTING ON LEFT SIDE AND ON RIGHT SIDE ARE ENSURED)
- MAKE SPACE ON SIDE OF PASSENGER SEAT LARGER THAN SPACE ON SIDE OF DRIVER'S SEAT (WHILE SPACES FOR BOARDING AND ALIGHTING ON LEFT SIDE AND ON RIGHT SIDE ARE ENSURED)
- MAKE SPACE ON SIDE OF DRIVER'S SEAT AND SPACE ON SIDE OF PASSENGER SEAT (IN IMAGINARY ARRANGEMENT) EQUAL
- MAKE SPACE AT REAR OF VEHICLE LARGE (SUCH THAT BACK DOOR OR TRUNK CAN BE OPENED)
- IT IS SUFFICIENT IF SPACES ON LEFT SIDE AND ON RIGHT SIDE HAVE MINIMUM SIZES THAT ALLOW OCCUPANTS TO BOARD AND ALIGHT FROM VEHICLE
- SPACE ON SIDE OF DRIVER'S SEAT IS ALLOWED TO BE TOO SMALL TO BOARD AND ALIGHT
- SPACE ON SIDE OF PASSENGER SEAT IS ALLOWED TO BE TOO SMALL TO BOARD AND ALIGHT
- IT IS BETTER IF OCCUPANTS CAN EASILY MOVE FROM POSITION TO STORE ASSOCIATED WITH PARKING LOT
- IT IS BETTER IF SPACE WHERE OCCUPANTS BOARD AND ALIGHT IS FAR FROM OBSTACLE
- IT IS BETTER IF THERE IS NOT PUDDLE IN SPACE WHERE OCCUPANTS BOARD AND ALIGHT

SIGNAL PROCESSING APPARATUS, SIGNAL PROCESSING METHOD, AND RECORDING MEDIUM

CROSS REFERENCE TO RELATED APPLICATIONS

This application is a U.S. National Phase of International Patent Application No. PCT/JP2023/006626 filed on Feb. 24, 2023, which claims priority benefit of Japanese Patent Application No. JP 2022-038485 filed in the Japan Patent Office on Mar. 11, 2022. Each of the above-referenced applications is hereby incorporated herein by reference in its entirety.

TECHNICAL FIELD

The present technology relates to a signal processing apparatus, a signal processing method, and a recording medium, and, in particular, relates to a signal processing apparatus, a signal processing method, and a recording medium that make it possible to propose an appropriate parking position in a free space.

BACKGROUND ART

In conventional automated parking assistance, parking frames divided by landmarks such as white lines or curb stones provided at a parking lot are sensed from an image, and an available parking frame is proposed to a driver as a parking position candidate (e.g. PTL 1). In a case where it is difficult to sense landmarks, it is also possible for a driver to adjust a parking position via an input interface (e.g. PTL 2 and PTL 3).

CITATION LIST

Patent Literature

[PTL 1]
Japanese Patent Laid-open No. 2021-94940
[PTL 2]
PCT Patent Publication No. WO2019/008764
[PTL 3]
Japanese Patent Laid-open No. 2019-43429

SUMMARY

Technical Problem

Meanwhile, in a case of parking in a free space such as a square or an empty lot where there are no landmarks as marks, an automated parking assistance system cannot present candidates of a parking position to a driver. In this case, the driver ends up parking relying on the shape of the free space and the like. The driver cannot determine whether a parking position of her/his own vehicle becomes a hindrance to the passage or parking of vehicles to come afterwards.

The present technology has been made in view of such a circumstance, and aims to make it possible to propose an appropriate parking position in a free space.

Solution to Problem

A signal processing apparatus according to one aspect of the present technology includes a candidate setting section that sets multiple stop position candidates as candidates of a stop position of a moving body in a free space around a subject moving body on the basis of free space information related to the free space, and a choosing section that chooses a recommended stop position recommended as the stop position of the subject moving body from the multiple stop position candidates.

A signal processing method according to one aspect of the present technology includes setting, by a signal processing apparatus, multiple stop position candidates as candidates of a stop position of a moving body in a free space around a subject moving body on the basis of free space information related to the free space, and choosing, by the signal processing apparatus, a recommended stop position recommended as the stop position of the subject moving body from the multiple stop position candidates.

A recording medium according to one aspect of the present technology has recorded thereon a program for executing processes of setting multiple stop position candidates as candidates of a stop position of a moving body in a free space around a subject moving body on the basis of free space information related to the free space, and choosing a recommended stop position recommended as the stop position of the subject moving body from the multiple stop position candidates.

In one aspect of the present technology, multiple stop position candidates are set as candidates of a stop position of a moving body in a free space around a subject moving body on the basis of free space information related to the free space, and a recommended stop position recommended is chosen as the stop position of the subject moving body from the multiple stop position candidates.

BRIEF DESCRIPTION OF DRAWINGS

FIG. 14 is a figure depicting examples of preference information.

DESCRIPTION OF EMBODIMENTS

Hereinbelow, modes for carrying out the present technology are explained. The explanation is given in the following sequence.

1. Configuration Example of Vehicle Control System
2. First Embodiment
3. Second Embodiment
4. Third Embodiment
5. Fourth Embodiment
6. Modification Example

1. Configuration Example of Vehicle Control System

Figure 1:
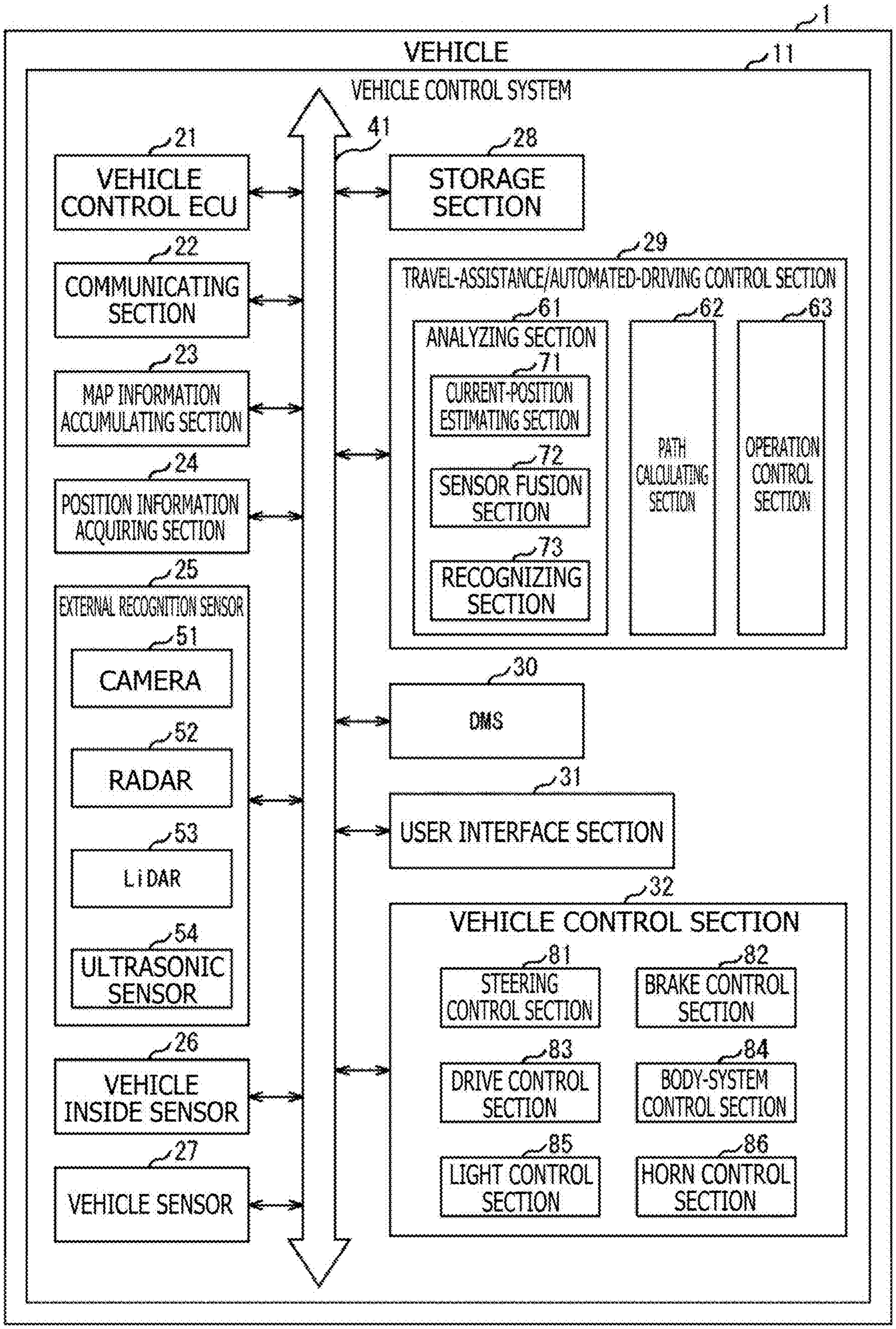
FIG. 1 is a block diagram depicting a configuration example of a vehicle control system.

FIG. 1 is a block diagram depicting a configuration example of a vehicle control system 11 which is an example of a moving apparatus control system to which the present technology is applied.

The vehicle control system 11 is provided to a vehicle 1, and performs processes related to travel assistance, automated driving, and automated parking of the vehicle 1.

The vehicle control system 11 includes a vehicle control ECU (Electronic Control Unit) 21, a communicating section 22, a map information accumulating section 23, a position information acquiring section 24, an external recognition sensor 25, a vehicle inside sensor 26, a vehicle sensor 27, a storage section 28, a travel-assistance/automated-driving control section 29, a DMS (Driver Monitoring System) 30, a user interface section 31, and a vehicle control section 32.

The vehicle control ECU 21, the communicating section 22, the map information accumulating section 23, the position information acquiring section 24, the external recognition sensor 25, the vehicle inside sensor 26, the vehicle sensor 27, the storage section 28, the travel-assistance/automated-driving control section 29, the driver monitoring system (DMS) 30, the user interface section 31, and the vehicle control section 32 are connected mutually communicatively via a communication network 41. For example, the communication network 41 includes an in-vehicle communication network, a bus, or the like conforming to a digital bidirectional communication standard such as a CAN (Controller Area Network), a LIN (Local Interconnect Network), a LAN (Local Area Network), FlexRay (registered trademark), or Ethernet (registered trademark). Different networks may be used as the communication network 41 depending on types of transferred data. For example, a CAN may be applied to data related to vehicle control, and Ethernet may be applied to large-volume data. Note that, in some cases, respective sections of the vehicle control system 11 are connected directly bypassing the communication network 41 using, for example, wireless communication that is supposed to be used for communication over relatively short distances such as near field communication (NFC (Near Field Communication)) or Bluetooth (registered trademark).

Note that, hereinbelow, reference to the communication network 41 is omitted in a case where respective sections of the vehicle control system 11 communicate via the communication network 41. For example, in a case where the vehicle control ECU 21 and the communicating section 22 communicate via the communication network 41, it is written simply that the vehicle control ECU 21 and the communicating section 22 communicate.

For example, the vehicle control ECU 21 includes various types of processor such as a CPU (Central Processing Unit) or an MPU (Micro Processing Unit). The vehicle control ECU 21 controls all or some of functions of the vehicle control system 11.

The communicating section 22 communicates with a variety of equipment inside the vehicle and outside the vehicle, other vehicles, servers, base stations, and the like, and performs transmission and reception of various types of data. At this time, the communicating section 22 can communicate using multiple communication schemes. Communication with the outside of the vehicle that the communicating section 22 can execute is explained briefly. For example, the communicating section 22 communicates with a server (hereinafter, called an external server) or the like on an external network via a base station or an access point by a wireless communication scheme such as 5G (5th Generation Mobile Communication System), LTE (Long Term Evolution), or DSRC (Dedicated Short Range Communications). For example, the external network that the communicating section 22 communicates with is the Internet, a cloud network, a network unique to a business operator, or the like. The communication scheme that the communicating section 22 uses for the communication performed with the external network is not limited particularly as long as it is a wireless communication scheme that allows digital bidirectional communication at a predetermined communication speed or faster and over a predetermined distance or longer.

In addition, for example, the communicating section 22 can communicate with a terminal near the subject vehicle using a P2P (Peer To Peer) technology. For example, the terminal near the subject vehicle is a terminal attached to a moving body such as a pedestrian or a bicycle that moves at a relatively low speed, a terminal that is positionally fixed and installed in a store or the like, or an MTC (Machine Type Communication) terminal. Furthermore, the communicating section 22 can also perform V2X communication. For example, V2X communication is communication between the subject vehicle and another entity such as vehicle to vehicle communication with another vehicle, vehicle to infrastructure communication with roadside equipment or the like, vehicle to home communication, or vehicle to pedestrian communication with a terminal carried by a pedestrian or the like.

For example, the communicating section 22 can externally receive (Over The Air) a program for updating software used to control operations of the vehicle control system 11. Furthermore, the communicating section 22 can externally receive map information, traffic information, information regarding the surroundings of the vehicle 1, or the like. In addition, for example, the communicating section 22 can externally transmit information related to the vehicle 1, information regarding the surroundings of the vehicle 1, or the like. For example, information regarding the vehicle 1 that the communicating section 22 externally transmits includes data representing the state of the vehicle 1, results of recognition by a recognizing section 73, and the like. Furthermore, for example, the communicating section 22 performs communication compatible with a vehicle emergency report system such as eCall.

For example, the communicating section 22 receives radio beacons, optical beacons, and electromagnetic waves transmitted by a road traffic information communication system (VICS (Vehicle Information and Communication System) (registered trademark)) such as FM multiplex broadcasting.

Communication that the communicating section 22 can execute with the inside of the vehicle is explained briefly. For example, the communicating section 22 can communicate with each piece of equipment inside the vehicle using wireless communication. For example, the communicating section 22 can wirelessly communicate with equipment inside the vehicle by a communication scheme that enables digital bidirectional communication at a predetermined communication speed or faster by wireless communication, such as a wireless LAN, Bluetooth, NFC, or WUSB (Wireless USB). This is not the sole example, but the communicating section 22 can also communicate with each piece of equipment inside the vehicle using wired communication. For example, the communicating section 22 can communicate with each piece of equipment inside the vehicle by wired communication via a cable connected to a connection terminal, which is not depicted. For example, the communicating section 22 can communicate with each piece of equipment inside the vehicle by a communication scheme that enables digital bidirectional communication at a predetermined communication speed or faster by wired communication, such as USB (Universal Serial Bus), HDMI (High-Definition Multimedia Interface) (registered trademark), or MHL (Mobile High-definition Link).

Here, for example, equipment inside the vehicle means equipment not connected to the communication network 41 inside the vehicle. For example, equipment inside the vehicle may be mobile equipment or wearable equipment carried by an occupant such as a driver, information equipment carried into the inside of the vehicle and temporarily installed inside the vehicle, and the like.

The map information accumulating section 23 accumulates externally-acquired maps and/or maps created at the vehicle 1. For example, the map information accumulating section 23 accumulates three-dimensional high-precision maps, global maps that have precision lower than the high-precision maps, and cover larger areas, or the like.

For example, the high-precision maps are dynamic maps, point cloud maps, vector maps, or the like. For example, the dynamic maps are maps including four layers, which are dynamic information, semi-dynamic information, semi-static information, and static information, and are provided from an external server or the like to the vehicle 1. The point cloud maps are maps including point clouds (point cloud data). For example, the vector maps are maps in which traffic information or the like such as the positions of lanes or traffic lights is associated with the point cloud maps to be compatible with ADAS (Advanced Driver Assistance System) or AD (Autonomous Driving).

For example, the point cloud maps and the vector maps may be provided from an external server or the like, or may be created at the vehicle 1 as maps for performing matching with a local map mentioned later on the basis of results of sensing by cameras 51, radars 52, a LiDAR 53, or the like, and accumulated in the map information accumulating section 23. In addition, in a case where the high-precision maps are provided from an external server or the like, map data related to a planned path that the vehicle 1 is about to travel, for example, map data of several hundred square meters of area along the planned path, is acquired from the external server or the like in order to reduce the amount of communicated data.

The position information acquiring section 24 receives GNSS signals from GNSS (Global Navigation Satellite System) satellites, and acquires position information regarding the vehicle 1. The acquired position information is supplied to the travel-assistance/automated-driving control section 29. Note that the position information acquiring section 24 may acquire position information not necessarily by a scheme using GNSS signals, but by using beacons, for example.

The external recognition sensor 25 includes various types of sensor used for recognition of the circumstance outside the vehicle 1, and supplies sensor data from each sensor to respective sections of the vehicle control system 11. The types and number of the sensors included in the external recognition sensor 25 can be any types and number.

For example, the external recognition sensor 25 includes the cameras 51, the radars 52, the LiDAR (Light Detection and Ranging, Laser Imaging Detection and Ranging) 53, and ultrasonic sensors 54. This is not the sole example, but the external recognition sensor 25 may include one or more types of sensor in the cameras 51, the radars 52, the LiDAR 53, and the ultrasonic sensors 54. The number of the cameras 51, the radars 52, the LiDAR 53, and the ultrasonic sensors 54 is not limited particularly as long as they can be really installed on the vehicle 1. In addition, the types of sensor included in the external recognition sensor 25 are not limited to this example, but the external recognition sensor 25 may include other types of sensor. An example of the sensing area of each sensor included in the external recognition sensor 25 is mentioned later.

Note that image-capturing schemes adopted by the cameras 51 are not limited particularly. For example, cameras that adopt various types of image-capturing scheme such as a ToF (Time Of Flight) camera, a stereo camera, a monocular camera, or an infrared camera that adopt image-capturing schemes that enable distance measurement can be applied as the cameras 51 as necessary. This is not the sole example, but the cameras 51 may be ones that are not related to distance measurement, but are for simply acquiring captured images.

In addition, for example, the external recognition sensor 25 can include an environment sensor for sensing the environment of the vehicle 1. The environment sensor is a sensor for sensing the environment related to weather, meteorological phenomena, brightness, or the like, and, for example, can include various types of sensor such as a raindrop sensor, a fog sensor, a sunlight sensor, a snow sensor, or an illuminance sensor.

Furthermore, for example, the external recognition sensor 25 includes a microphone used for sensing sounds around the vehicle 1, the positions of sound sources, or the like.

The vehicle inside sensor 26 includes various types of sensor for sensing information regarding the inside of the vehicle, and supplies sensor data from each sensor to respective sections of the vehicle control system 11. The types and number of the various sensors included in the vehicle inside sensor 26 are not limited particularly as long as they can be really installed on the vehicle 1.

For example, the vehicle inside sensor 26 can include one or more types of sensor in a camera, a radar, a seating sensor, a steering wheel sensor, a microphone, and a bio-information sensor. As the camera included in the vehicle inside sensor 26, for example, cameras that adopt various types of image-capturing scheme that enable distance measurement, such as a ToF camera, a stereo camera, a monocular camera, or an infrared camera can be used. This is not the sole example, but the camera included in the vehicle inside sensor 26 may be one that is not related to distance measurement, but is for simply acquiring captured images. For example, the bio-information sensor included in the vehicle inside sensor 26 is provided on a seat, a steering wheel, or the like, and senses various types of bio-information regarding an occupant such as a driver.

The vehicle sensor 27 includes various types of sensor for sensing the state of the vehicle 1, and supplies sensor data from each sensor to respective sections of the vehicle control system 11. The types and number of the various sensors included in the vehicle sensor 27 are not limited particularly as long as they can be really installed on the vehicle 1.

For example, the vehicle sensor 27 includes a speed sensor, an acceleration sensor, an angular velocity sensor (gyro sensor), and an inertial measurement unit (IMU) formed by integrating them. For example, the vehicle sensor 27 includes a steering angle sensor that senses the steering angle of a steering wheel, a yaw rate sensor, an accelerator sensor that senses the operation amount of an accelerator pedal, and a brake sensor that senses the operation amount of a brake pedal. For example, the vehicle sensor 27 includes a rotation sensor that senses the rotation speed of an engine or a motor, an air pressure sensor that senses the air pressure of a tire, a skid rate sensor that senses the skid rate of a tire, and a wheel speed sensor that senses the rotation speed of a wheel. For example, the vehicle sensor 27 includes a battery sensor that senses the remaining capacity and temperature of a battery, and a shock sensor that senses external shocks.

The storage section 28 includes a non-volatile storage medium and/or a volatile storage medium, and stores data and programs. For example, the storage section 28 is used as an EEPROM (Electrically Erasable Programmable Read Only Memory) and a RAM (Random Access Memory), and a magnetic storage device, a semiconductor storage device, an optical storage device, and a magneto-optical storage device such as an HDD (Hard Disc Drive) can be applied as the storage medium. The storage section 28 stores various types of program and data used by respective sections of the vehicle control system 11. For example, the storage section 28 includes an EDR (Event Data Recorder) or a DSSAD (Data Storage System for Automated Driving), and stores information regarding the vehicle 1 before and after an event such as an accident, and information acquired by the vehicle inside sensor 26.

The travel-assistance/automated-driving control section 29 controls travel assistance and automated driving of the vehicle 1. For example, the travel-assistance/automated-driving control section 29 includes an analyzing section 61, a path calculating section 62, and an operation control section 63.

The analyzing section 61 performs a process of analyzing the vehicle 1 and the circumstance around the vehicle 1. The analyzing section 61 includes a current-position estimating section 71, a sensor fusion section 72, and the recognizing section 73.

The current-position estimating section 71 estimates the current position of the vehicle 1 on the basis of sensor data from the external recognition sensor 25, and high-precision maps accumulated in the map information accumulating section 23. For example, the current-position estimating section 71 generates a local map on the basis of the sensor data from the external recognition sensor 25, and performs matching between the local map and the high-precision maps to thereby estimate the current position of the vehicle 1. For example, the position of the vehicle 1 is represented using the center of the axle of a rear-wheel pair as a reference position.

For example, the local map is a three-dimensional high-precision map created using a technology such as SLAM (Simultaneous Localization and Mapping), an occupancy grid map, or the like. For example, the three-dimensional high-precision map is a point cloud map mentioned above, or the like. The occupancy grid map is a map that has grid squares with a predetermined size obtained by dividing the three-dimensional or two-dimensional space around the vehicle 1, and represents the object occupancy state of each grid square. For example, the object occupancy state is represented by the presence/absence or probability of presence of an object. For example, the local map is used also for a process of sensing and a process of recognizing the circumstance outside the vehicle 1 performed by the recognizing section 73.

Note that the current-position estimating section 71 may estimate the current position of the vehicle 1 on the basis of position information acquired by the position information acquiring section 24, and sensor data from the vehicle sensor 27.

The sensor fusion section 72 performs a sensor fusion process of combining multiple different types of sensor data (e.g. image data supplied from the cameras 51, and sensor data supplied from the radars 52), and obtaining new information. Examples of the method of combining the different types of sensor data include integration, merging, concatenation, or the like.

The recognizing section 73 executes a sensing process of sensing the circumstance outside the vehicle 1, and a recognition process of recognizing the circumstance outside the vehicle 1.

For example, the recognizing section 73 performs the processes of sensing and recognizing the circumstance outside the vehicle 1 on the basis of information from the external recognition sensor 25, information from the current-position estimating section 71, information from the sensor fusion section 72, and the like.

Specifically, for example, the recognizing section 73 performs processes of sensing and recognizing objects around the vehicle 1, or the like. For example, the object sensing process is a process of sensing the presence/absence, sizes, forms, positions, motions, and the like of objects. For example, the object recognition process is a process of recognizing the attribute, such as type, of an object or identifying a particular object, and so on. It should be noted that the sensing process and the recognition process are not necessarily clearly separate processes, and are overlapping processes in some cases.

For example, the recognizing section 73 senses objects around the vehicle 1 by performing clustering to classify point clouds based on sensor data from the radars 52, the LiDAR 53, or the like into each cluster of the point clouds. Thereby, the presence/absence, sizes, shapes, and positions of objects around the vehicle 1 are sensed.

For example, the recognizing section 73 senses a motion of an object around the vehicle 1 by performing tracking to track motions of a cluster of point clouds classified by clustering. Thereby, the speed and advancing direction (movement vector) of the object around the vehicle 1 are sensed.

For example, the recognizing section 73 senses or recognizes vehicles, humans, bicycles, obstacles, structures, roads, traffic lights, traffic signs, road markings, and the like on the basis of image data supplied from the cameras 51. In addition, the recognizing section 73 may recognize the types of objects around the vehicle 1 by performing a recognition process such as semantic segmentation.

For example, the recognizing section 73 can perform a process of recognizing traffic rules around the vehicle 1 on the basis of maps accumulated in the map information accumulating section 23, results of estimation of the current position by the current-position estimating section 71, and results of recognition of objects around the vehicle 1 by the recognizing section 73. By this process, the recognizing section 73 can recognize the positions and states of traffic lights, the content of traffic signs and road markings, the content of traffic regulations, lanes where vehicles are allowed to travel, and the like.

For example, the recognizing section 73 can perform a process of recognizing the environment around the vehicle 1. Target aspects of the environment around the vehicle 1 to be recognized by the recognizing section 73 may be weather, temperature, humidity, brightness, road surface states, and the like.

The path calculating section 62 creates an action plan of the vehicle 1. For example, the path calculating section 62 creates the action plan by performing processes of path planning and path tracking.

Note that the path planning (Global path planning) is a process of planning a general path from a start to a goal. This path planning includes also a process which is called trajectory planning, in which generation (Local path planning) of a trajectory, on the planned path, that allows the vehicle 1 to advance safely and smoothly near the vehicle 1 is performed taking into consideration the movement characteristics of the vehicle 1.

The path tracking is a process of planning operation for allowing the vehicle 1 to travel the path planned by the path planning in a planned length of time safely and accurately. For example, the path calculating section 62 can calculate a target speed and a target angular velocity of the vehicle 1 on the basis of results of the path tracking process.

The operation control section 63 controls operation of the vehicle 1 in order to realize the action plan created by the path calculating section 62.

For example, the operation control section 63 controls a steering control section 81, a brake control section 82, and a drive control section 83 that are included in the vehicle control section 32 mentioned later to perform acceleration/deceleration control and direction control such that the vehicle 1 advances along the trajectory calculated by the trajectory planning. For example, the operation control section 63 performs coordination control aimed for realization of ADAS functions such as collision avoidance or shock reduction, follow-up traveling, cruise control traveling, collision warning about the subject vehicle, or lane deviation warning about the subject vehicle. For example, the operation control section 63 performs coordination control aimed for automated driving by which the vehicle 1 travels autonomously independently of operation by a driver, or the like.

The DMS 30 performs a process of authenticating a driver, a process of recognizing the state of the driver, and the like on the basis of sensor data from the vehicle inside sensor 26, input data input to the user interface section 31 mentioned later, and the like. For example, target aspects of the state of the driver to be recognized may include physical conditions, the degree of awakening, the degree of concentration, the fatigue, the line-of-sight direction, the degree of drunkenness, driving operation, the posture, and the like.

Note that the DMS 30 may perform a process of authenticating occupants other than the driver, and a process of recognizing the states of the occupants. In addition, for example, the DMS 30 may perform a process of recognizing the circumstance of the inside of the vehicle on the basis of sensor data from the vehicle inside sensor 26. For example, target aspects of the circumstance of the inside of the vehicle to be recognized may include temperature, humidity, brightness, smells, and the like.

The user interface section 31 is used for inputting various types of data, instructions, and the like, and presents various types of data to a driver and the like.

Data input on the user interface section 31 is explained briefly. The user interface section 31 includes an input device used by a human to input data. The user interface section 31 generates an input signal on the basis of data, instructions, or the like input by using the input device, and supplies the input signal to respective sections of the vehicle control system 11. As the input device, for example, the user interface section 31 includes controllers such as a touch panel, a button, a switch, or a lever. This is not the sole example, but the user interface section 31 may further include an input device that enables information input by a method not involving manual operation, but involving sounds, gestures, or the like. Furthermore, for example, the user interface section 31 may use, as an input device, a remote control apparatus that uses infrared rays or radio waves, or externally connected equipment such as mobile equipment or wearable equipment that supports operation of the vehicle control system 11.

Data presentation on the user interface section 31 is explained briefly. The user interface section 31 generates visual information, auditory information, and tactile information for occupants or the outside of the vehicle. In addition, the user interface section 31 performs output control of controlling the output, output contents, output timing, output method, and the like of each piece of the generated information. For example, as visual information, the user interface section 31 generates and outputs information represented by images or light such as monitor images representing operation screens, state display about the vehicle 1, warning display, or the circumstance around the vehicle 1. In addition, as auditory information, for example, the user interface section 31 generates and outputs information represented by sounds such as audio guidance, beeps, or warning messages. Furthermore, as tactile information, for example, the user interface section 31 generates and outputs information to be given to the tactile sensation of an occupant by force, vibration, motion, or the like.

For example, a display apparatus that presents the visual information by displaying images by itself, and a projector apparatus that presents the visual information by projecting images can be applied as output devices to which the user interface section 31 outputs the visual information. Note that, other than a typical display apparatus having a display, for example, the display apparatus may be also an apparatus that displays the visual information in the visual field of an occupant such as a head-up display, a transmission display, or a wearable device having an AR (Augmented Reality) function. In addition, the user interface section 31 can also use, as an output apparatus that outputs the visual information, a display device of a navigation apparatus, an instrument panel, a CMS (Camera Monitoring System), an electronic mirror, a lamp, or the like provided to the vehicle 1.

For example, an audio speaker, headphones, or earphones can be applied as output devices to which the user interface section 31 outputs the auditory information.

For example, a haptic element using a haptic technology can be applied as an output device to which the user interface section 31 outputs the tactile information. For example, the haptic element is provided at a portion where an occupant of the vehicle 1 contacts such as a steering wheel or a seat.

The vehicle control section 32 controls respective sections of the vehicle 1. The vehicle control section 32 includes the steering control section 81, the brake control section 82, the drive control section 83, a body-system control section 84, a light control section 85, and a horn control section 86.

The steering control section 81 performs sensing and control of the state of the steering system of the vehicle 1, and the like. For example, the steering system includes a steering mechanism including a steering wheel or the like, electric power steering, and the like. For example, the steering control section 81 includes a steering ECU that controls the steering system, an actuator that drives the steering system, and the like.

The brake control section 82 performs sensing and control of the state of the brake system of the vehicle 1, and the like. For example, the brake system includes a brake mechanism including a brake pedal or the like, an ABS (Antilock Brake System), a regenerative brake mechanism, and the like. For example, the brake control section 82 includes a brake ECU that controls the brake system, an actuator that drives the brake system, and the like.

The drive control section 83 performs sensing and control of the state of the drive system of the vehicle 1, and the like. For example, the drive system includes an accelerator pedal, a drive force generating apparatus for generating drive force such as an internal combustion engine or a drive motor, a drive force transmission mechanism for transmitting the drive force to wheels, and the like. For example, the drive control section 83 includes a drive ECU that controls the drive system, an actuator that drives the drive system, and the like.

The body-system control section 84 performs sensing and control of the state of the body system of the vehicle 1, and the like. For example, the body system includes a keyless entry system, a smart key system, a power window apparatus, a power seat, an air-conditioning apparatus, airbags, seat belts, a shift lever, and the like. For example, the body-system control section 84 includes a body system ECU that controls the body system, an actuator that drives the body system, and the like.

The light control section 85 performs sensing and control of the states of various types of light of the vehicle 1, and the like. For example, target lights to be controlled may be headlights, backlights, fog lights, turn signals, brake lights, projection, bumper display, and the like. The light control section 85 includes a light ECU that controls lights, actuators that drive the lights, and the like.

The horn control section 86 performs sensing and control of the state of a car horn of the vehicle 1, and the like. For example, the horn control section 86 includes a horn ECU that controls the car horn, an actuator that drives the car horn, and the like.

Figure 2:
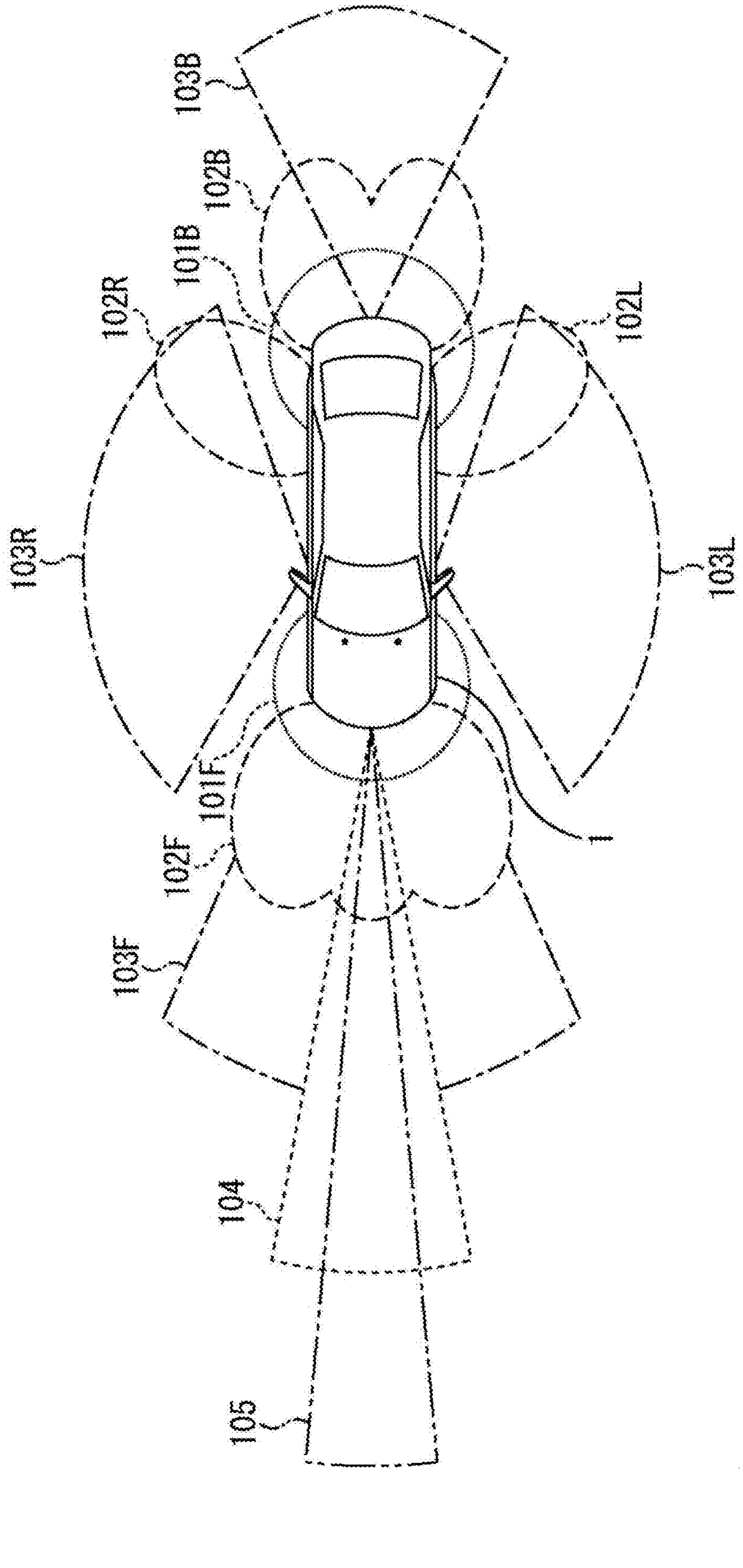
FIG. 2 is a figure depicting an example of sensing areas.

FIG. 2 is a figure depicting an example of sensing areas of the cameras 51, the radars 52, the LiDAR 53, the ultrasonic sensors 54, and the like of the external recognition sensor 25 in FIG. 1. Note that FIG. 2 schematically depicts the state of the vehicle 1 as seen from above. The left end side is the front end (front) side of the vehicle 1, and the right end side is the rear end (rear) side of the vehicle 1.

A sensing area 101F and a sensing area 101B represent an example of sensing areas of the ultrasonic sensors 54. The sensing area 101F covers the vicinity of the front end of the vehicle 1 with the multiple ultrasonic sensors 54. The sensing area 101B covers the vicinity of the rear end of the vehicle 1 with the multiple ultrasonic sensors 54.

For example, results of sensing in the sensing area 101F and the sensing area 101B are used for parking assistance of the vehicle 1, and the like.

A sensing area 102F to a sensing area 102B represent an example of sensing areas of short-range or middle-range radars 52. In front of the vehicle 1, the sensing area 102F covers positions farther than the sensing area 101F. Behind the vehicle 1, the sensing area 102B covers positions farther than the sensing area 101B. The sensing area 102L covers the vicinity behind the left side surface of the vehicle 1. The sensing area 102R covers the vicinity behind the right side surface of the vehicle 1.

For example, results of sensing in the sensing area 102F are used for sensing vehicles, pedestrians, and the like that are in front of the vehicle 1, and the like. For example, results of sensing in the sensing area 102B are used for a function to prevent collisions behind the vehicle 1, and the like. For example, results of sensing in the sensing area 102L and the sensing area 102R are used for sensing objects in blind spots on the side of the vehicle 1, and the like.

A sensing area 103F to a sensing area 103B represent an example of sensing areas of the cameras 51. In front of the vehicle 1, the sensing area 103F covers positions farther than the sensing area 102F. Behind the vehicle 1, the sensing area 103B covers positions farther than the sensing area 102B. The sensing area 103L covers the vicinity of the left side surface of the vehicle 1. The sensing area 103R covers the vicinity of the right side surface of the vehicle 1.

For example, results of sensing in the sensing area 103F can be used for recognition of traffic lights and traffic signs, a lane deviation prevention assistance system, and an automated headlight control system. For example, results of sensing in the sensing area 103B can be used for parking assistance and a surround view system. For example, results of sensing in the sensing area 103L and the sensing area 103R can be used for the surround view system.

A sensing area 104 represents an example of a sensing area of the LiDAR 53. In front of the vehicle 1, the sensing area 104 covers positions farther than the sensing area 103F. On the other hand, the sensing area 104 has a narrower range in the left-right direction than the sensing area 103F.

For example, results of sensing in the sensing area 104 are used for sensing objects such as nearby vehicles.

A sensing area 105 represents an example of a sensing area of a long-range radar 52. In front of the vehicle 1, the sensing area 105 covers positions farther than the sensing area 104. On the other hand, the sensing area 105 has a narrower range in the left-right direction than the sensing area 104.

For example, results of sensing in the sensing area 105 are used for ACC (Adaptive Cruise Control), emergency braking, collision avoidance, and the like.

Note that the sensing area of each sensor of the cameras 51, the radars 52, the LiDAR 53, and the ultrasonic sensors 54 included in the external recognition sensor 25 may be configured in various manners other than that in FIG. 2. Specifically, the ultrasonic sensors 54 may perform sensing also of the side of the vehicle 1, and the LiDAR 53 may perform sensing of the back of the vehicle 1. In addition, the installation position of each sensor is not limited to each example mentioned above. In addition, the number of each type of sensor may be one or may be more than one.

2. First Embodiment

Next, a first embodiment of the present technology is explained with reference to FIG. 3 to FIG. 11.

<Configuration Example of Vehicle Control System>

Figure 3:
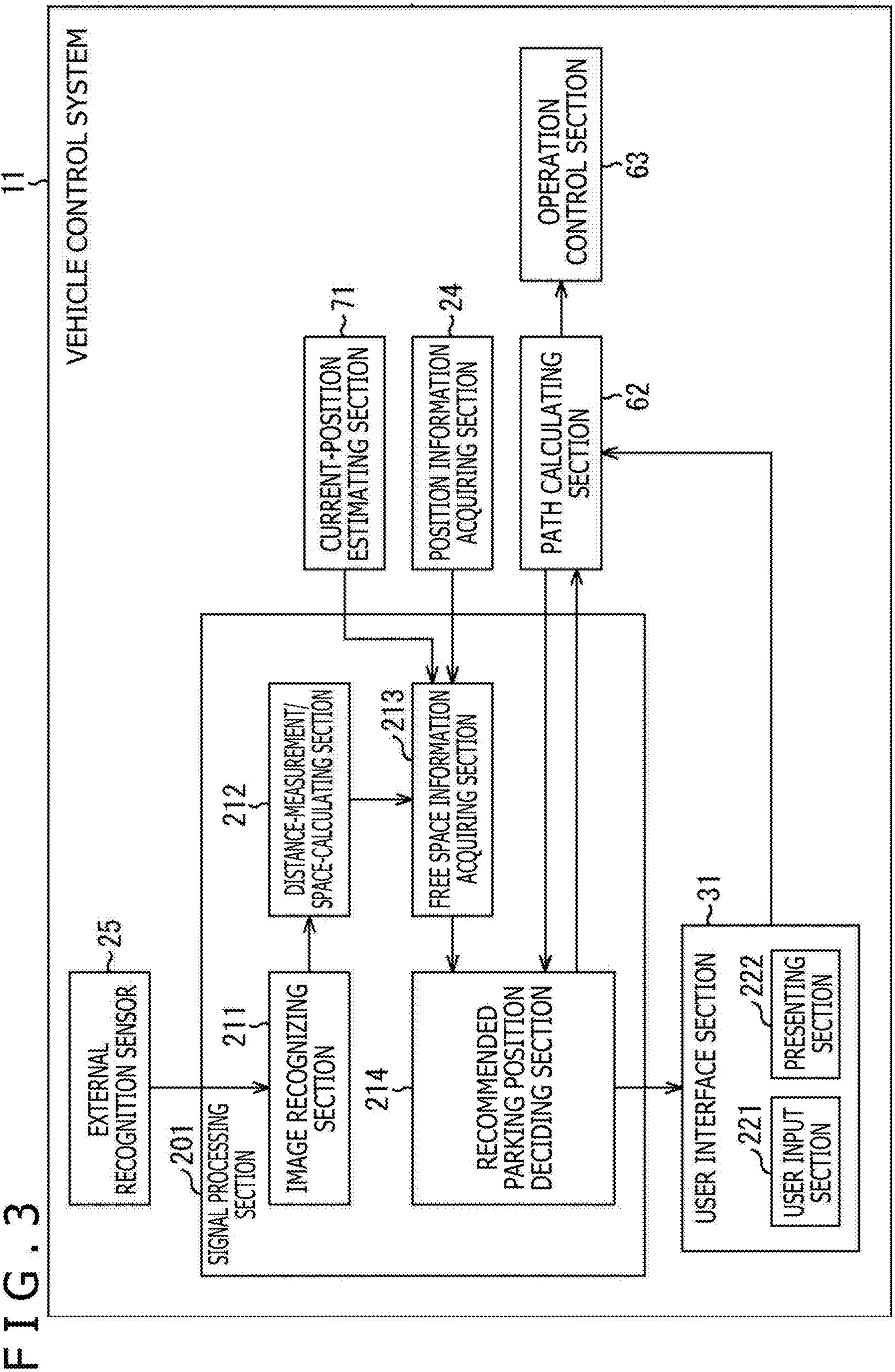
FIG. 3 is a block diagram depicting a configuration example of the vehicle control system according to a first embodiment of the present technology.

FIG. 3 is a block diagram depicting a configuration example of the vehicle control system 11 according to the first embodiment of the present technology.

The vehicle control system 11 in FIG. 3 includes, along with the configuration mentioned above, a signal processing section 201 that sets candidates of a parking position in a free space around the vehicle 1. The free space is a location where the vehicle 1 can travel. The free space includes a flat surface where there are no obstacles and the vehicle 1 can park, such as an empty lot, a square, or a parking lot. Note that FIG. 3 depicts the configuration of portions related to parking assistance in the free space, in the configuration of the vehicle control system 11.

The signal processing section 201 corresponds to the analyzing section 61 in FIG. 1. The signal processing section 201 includes an image recognizing section 211, a distance-measurement/space-calculating section 212, a free space information acquiring section 213, and a recommended parking position deciding section 214.

The image recognizing section 211 recognizes a free space and an existing vehicle that is a vehicle parked in a parking lot on an image captured with a camera 51 of the external recognition sensor 25. The camera 51 includes a surround camera, a front sensing camera, or the like.

Figure 4:
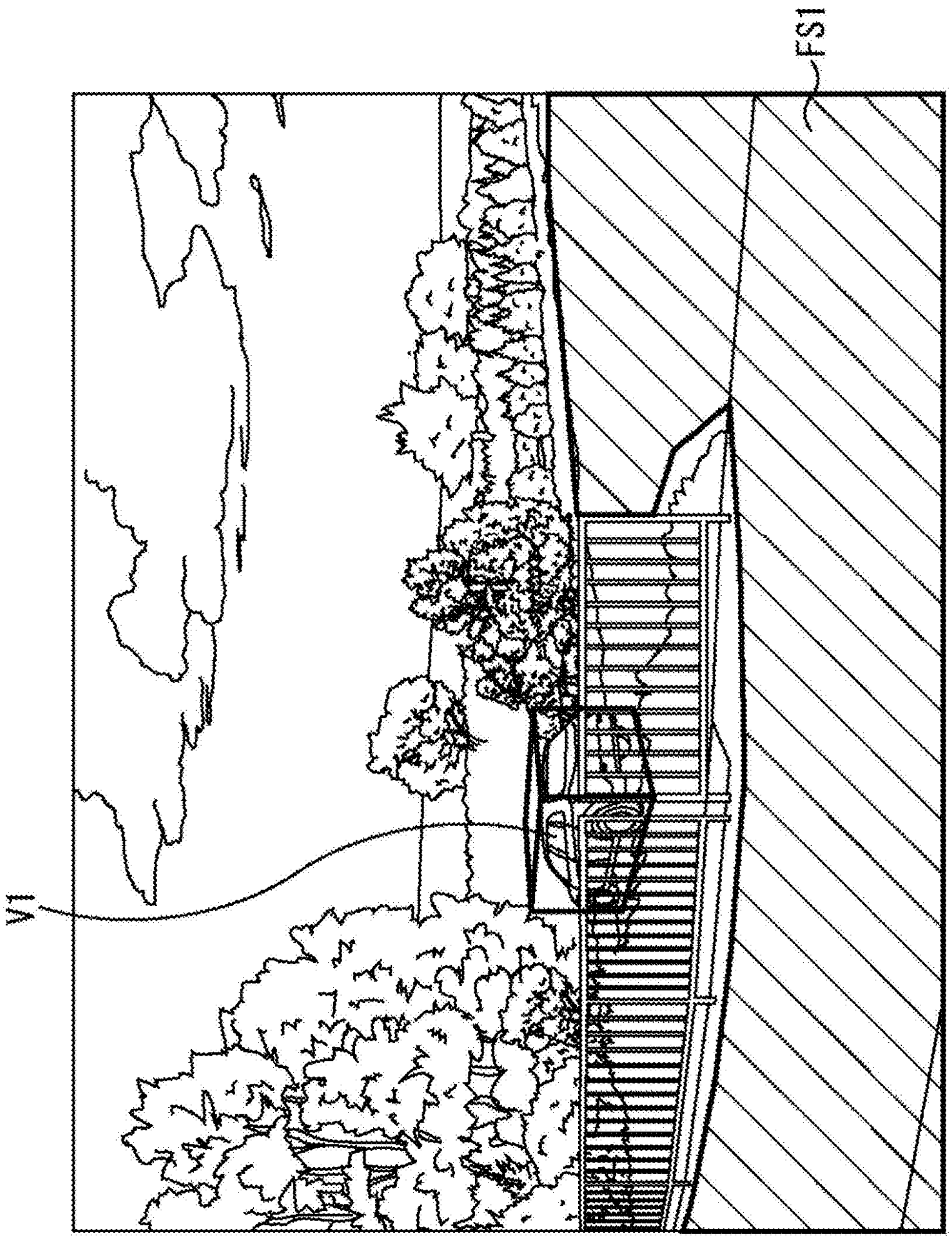
FIG. 4 is a figure depicting an example of a free space and an existing vehicle recognized by an image recognizing section.

FIG. 4 is a figure depicting an example of a free space and an existing vehicle recognized by the image recognizing section 211.

For example, the image recognizing section 211 detects, as a free space FS1, a road and a parking lot on an image as represented by hatching in FIG. 4. In addition, the image recognizing section 211 detects, on the image, an existing vehicle V1 parked in the free space FS1 as represented by an approximately rectangular parallelepiped frame surrounding it in FIG. 4. The image recognizing section 211 also detects the orientation of the existing vehicle V1.

The image recognizing section 211 supplies detection results about the free space and the existing vehicle to the distance-measurement/space-calculating section 212 in FIG. 3. Note that the detection of the free space and the existing vehicle by the image recognizing section 211 may be performed on the basis of sensor data from sensors such as the radars 52, the LiDAR 53, the ultrasonic sensors 54, or the like included in the external recognition sensor 25.

The distance-measurement/space-calculating section 212 calculates the shape of the free space detected by the image recognizing section 211, calculates the position of the existing vehicle in the free space, and so on. The distance-measurement/space-calculating section 212 supplies, to the free space information acquiring section 213, information representing the shape of the free space, information representing whether or not there is an existing vehicle, and information representing the position and orientation of the existing vehicle. Examples of the information representing the shape (including the size) of the free space include information representing a shape type (e.g. an oblong, a triangle, etc.) and conditions defining a shape size (e.g. the sizes of sides of a polygon). In addition, in a case where the free space is represented by a polygon, other examples of the information representing the shape of the free space include information regarding the positions of feature points such as vertices, information regarding connection between feature points, information regarding the lengths and orientations of sides linking feature points, the angle formed between a first side and second side which are adjacent at each vertex, and the like. As the information representing the shape of the free space, information other than these pieces of information may be used.

The free space information acquiring section 213 acquires, as free space information which is information regarding the free space, the information representing the shape of the free space, information representing whether or not there is an existing vehicle, and the information representing the position of the existing vehicle, the size of the existing vehicle, and the orientation of the existing vehicle supplied from the distance-measurement/space-calculating section 212.

The free space information acquiring section 213 can also acquire the free space information on the basis of a local map generated by the current-position estimating section 71. In addition, on the basis of position information regarding the vehicle 1 acquired by the position information acquiring section 24, and the current position of the vehicle 1 estimated by the current-position estimating section 71, the free space information acquiring section 213 can also acquire map information regarding the surroundings around the vehicle 1, and acquire the free space information on the basis of the map information.

The free space information acquiring section 213 supplies the acquired free space information to the recommended parking position deciding section 214.

On the basis of the free space information supplied from the free space information acquiring section 213, the recommended parking position deciding section 214 decides a recommended parking position to be recommended as a parking position of the vehicle 1 in the free space around the vehicle 1. The recommended parking position deciding section 214 supplies information representing the recommended parking position to the user interface section 31.

The user interface section 31 includes a user input section 221 and a presenting section 222.

The user input section 221 includes an input device such as a touch panel, a button, a switch, or a lever. The user input section 221 accepts input of operation by a user.

The presenting section 222 includes an output device such as a display apparatus or a projector. The presenting section 222 presents the recommended parking position decided by the recommended parking position deciding section 214 to a driver of the vehicle 1 or a user including another occupant.

Figure 5:
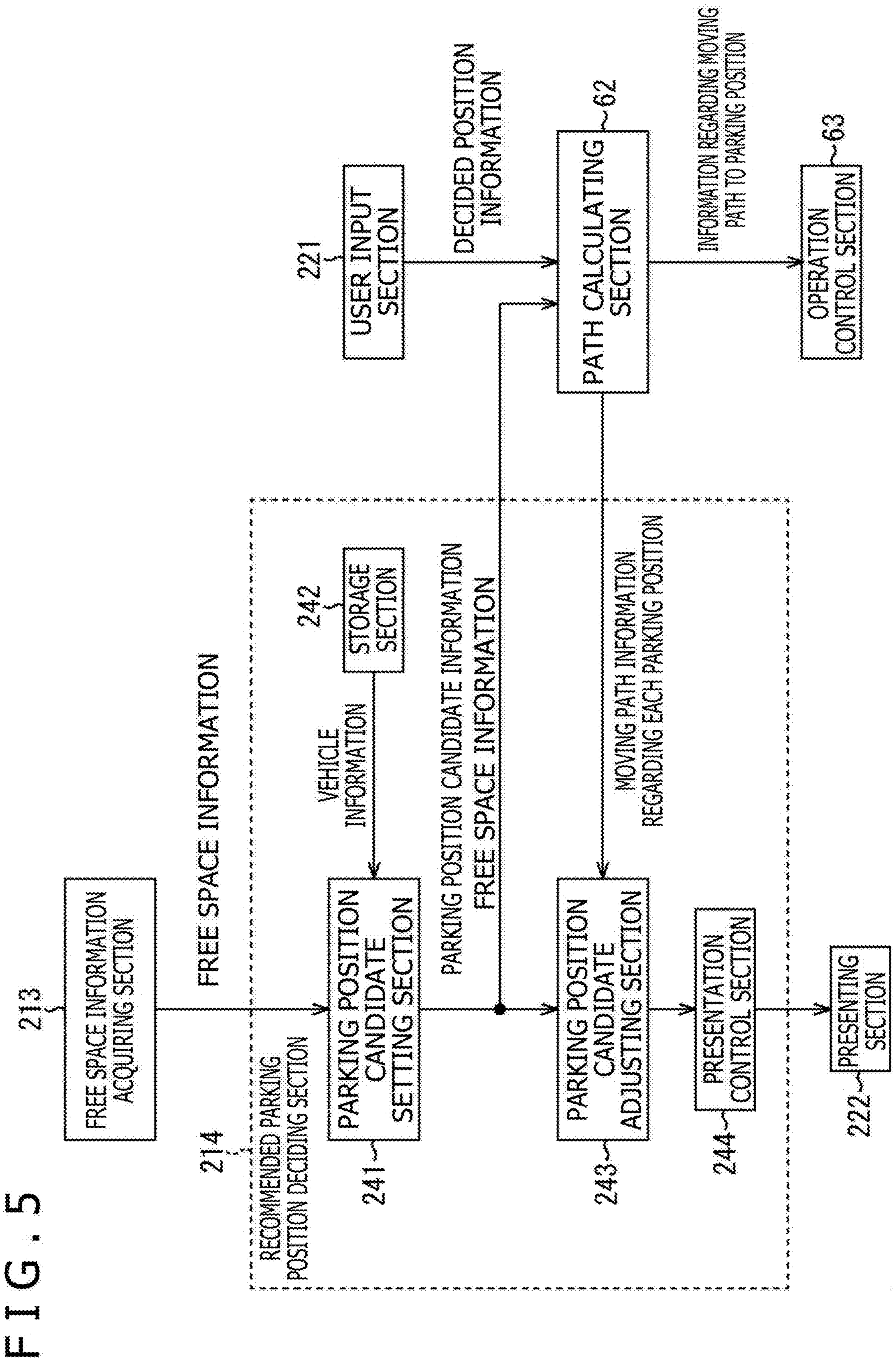
FIG. 5 is a block diagram depicting a detailed configuration of portions related to decision of a recommended parking position.

FIG. 5 is a block diagram depicting a detailed configuration of portions related to decision of a recommended parking position.

As depicted in FIG. 5, the recommended parking position deciding section 214 includes a parking position candidate setting section 241, a storage section 242, a parking position candidate adjusting section 243, and a presentation control section 244.

The parking position candidate setting section 241 acquires vehicle information from the storage section 242, and, on the basis of the vehicle information and the free space information supplied from the free space information acquiring section 213, sets multiple parking position candidates as candidates of a parking position in the free space around the vehicle 1. For example, the vehicle information includes information representing the average size of vehicles. Specifically, the parking position candidate setting section 241 arranges, sequentially from an end of the free space, parking spaces with sizes based on the size of one vehicle represented by the vehicle information. In a case where there are multiple parking spaces arranged, after the arrangement of the parking spaces, the parking position candidate setting section 241 adjusts the positions of the arranged parking spaces such that the intervals between the parking spaces become equal. The parking position candidate setting section 241 sets the adjusted positions of the parking spaces as parking position candidates. At the time of the arrangement of the parking spaces, the sizes of particular parking spaces may be set to sizes reflecting preferences of a user such that left and right clearances based on the preferences of the user can be ensured.

The parking position candidate setting section 241 supplies, to the parking position candidate adjusting section 243 and the path calculating section 62, the free space information and parking position candidate information representing each of the multiple parking position candidates.

As the vehicle information, preset vehicle sizes and the like are stored on the storage section 242.

The parking position candidate adjusting section 243 functions as a choosing section that chooses, from the multiple parking position candidates set by the parking position candidate setting section 241, a recommended parking position on the basis of moving path information regarding each parking position candidate supplied from the path calculating section 62. The parking position candidate adjusting section 243 supplies information representing the chosen recommended parking position to the presentation control section 244.

The presentation control section 244 causes the presenting section 222 to propose, to a user, the recommended parking position chosen by the parking position candidate adjusting section 243.

The user can check the recommended parking position proposed from the vehicle control system 11, and perform operation to set a parking position of the vehicle 1 via the user input section 221. Here, the user input section 221 functions as a deciding section to be used to decide a parking position of the vehicle 1. The user input section 221 supplies, to the path calculating section 62, decided position information representing the parking position set by the user.

The path calculating section 62 calculates a moving path for a vehicle parked at each of the multiple parking position candidates set by the parking position candidate setting section 241 to exit from the free space. The path calculating section 62 supplies, to the parking position candidate adjusting section 243, moving path information representing the moving path of each parking position candidate.

In addition, the path calculating section 62 calculates a moving path of the vehicle 1 to the parking position represented by the decided position information supplied from the user input section 221, and supplies moving path information representing the moving path to the operation control section 63.

The operation control section 63 causes the vehicle 1 to move to the parking position and stop there by controlling operation of the vehicle 1 on the basis of the moving path information supplied from the path calculating section 62.

<Operation of Vehicle Control System>

Next, a process executed by the vehicle control system 11 is explained with reference to a flowchart in FIG. 6.

Figure 6:
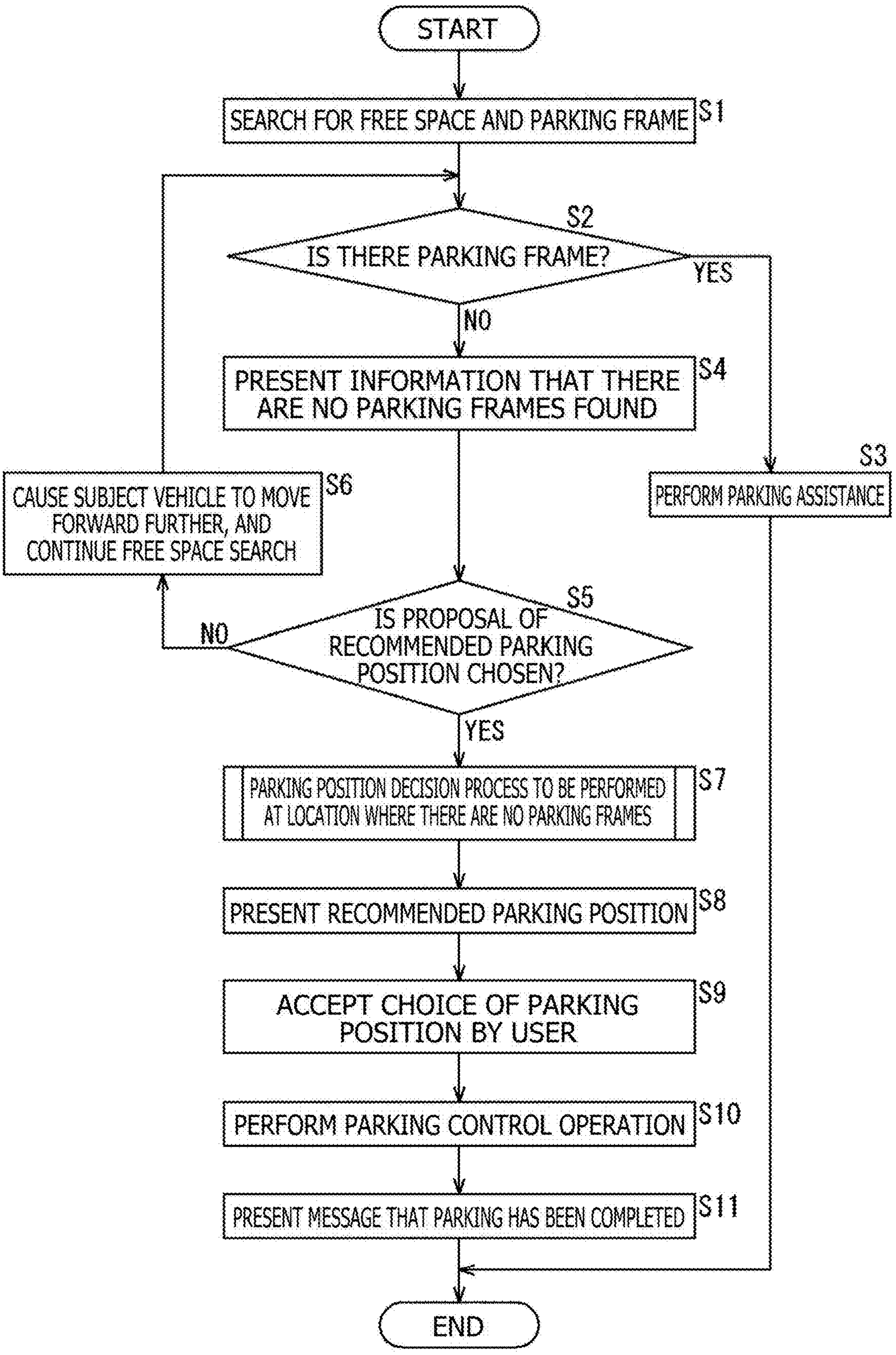
FIG. 6 is a flowchart for explaining a process executed by the vehicle control system.

For example, the process in FIG. 6 is started when a user presses a switch for starting an operation of the vehicle control system 11 when the vehicle 1 approaches a parking lot or the like where the user wants to park the vehicle 1. Note that even if a switch is not pressed, the process in FIG. 6 may be started when the vehicle control system 11 grasps that the vehicle 1 approaches a parking lot which is a destination input in advance on a car navigation system or the like.

At Step S1, the image recognizing section 211 searches for a free space and a parking frame on the basis of sensor data of the external recognition sensor 25.

At Step S2, the image recognizing section 211 determines whether or not there is a parking frame around the vehicle 1. For example, in a case where the image recognizing section 211 can detect a parking frame on a captured image of the surroundings of the vehicle 1, the image recognizing section 211 determines that there is a parking frame around the vehicle 1.

In a case where it is determined at Step S2 that there is a parking frame, at Step S3, the vehicle control system 11 performs parking assistance to be performed in a case where there is a parking frame. A parking assistance process to be performed in a case where there is a parking frame is performed using a known technology. For example, the vehicle control system 11 displays the parking frame, proposes a parking position, and so on. Thereafter, the process ends.

On the other hand, in a case where it is determined at Step S2 that there are no parking frames, at Step S4, the presenting section 222 presents information that there are no parking frames found to the user.

Figure 7:
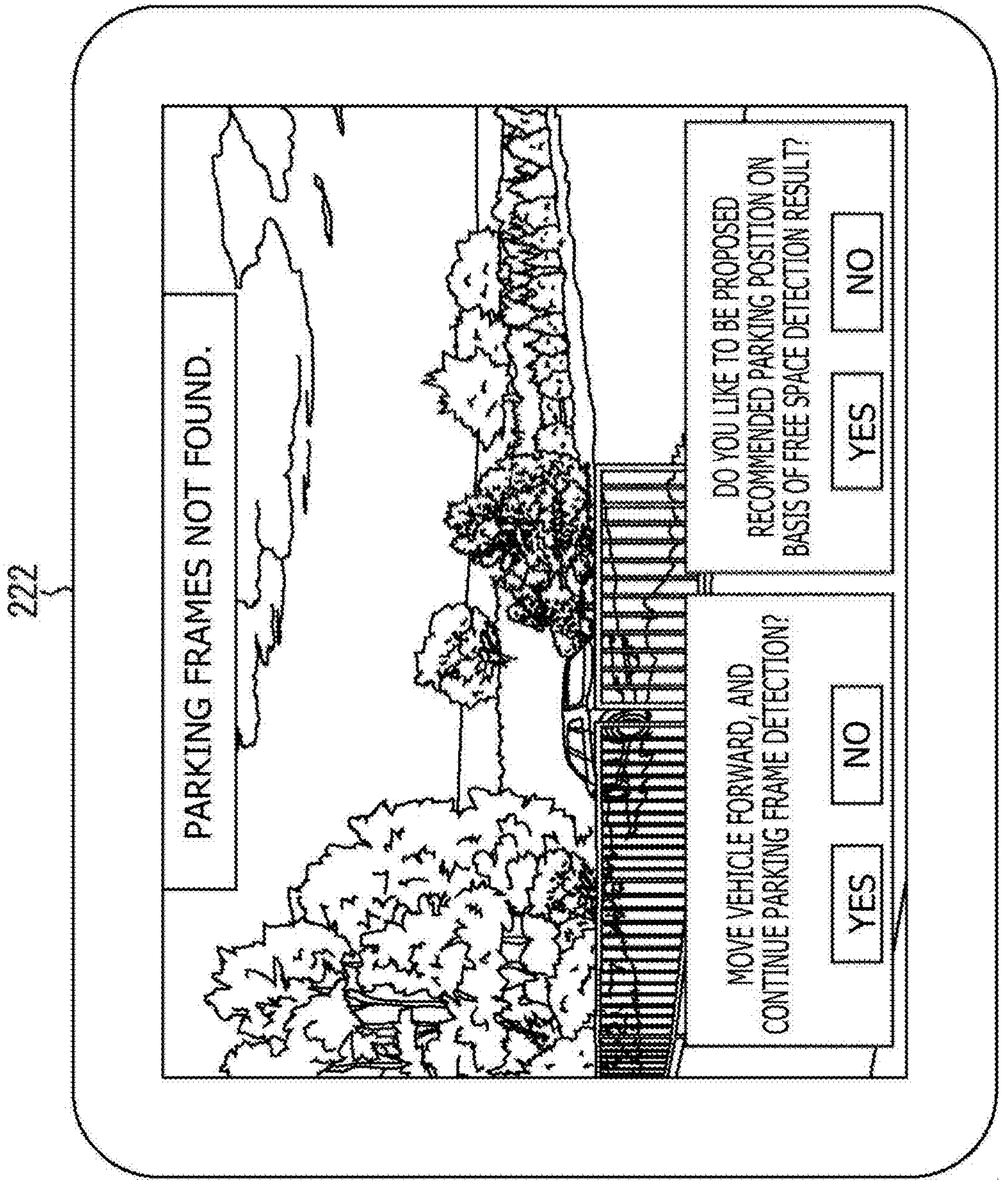
FIG. 7 is a figure depicting an example of a screen displayed on a presenting section in a case where there are no parking frames.
Figure 8:
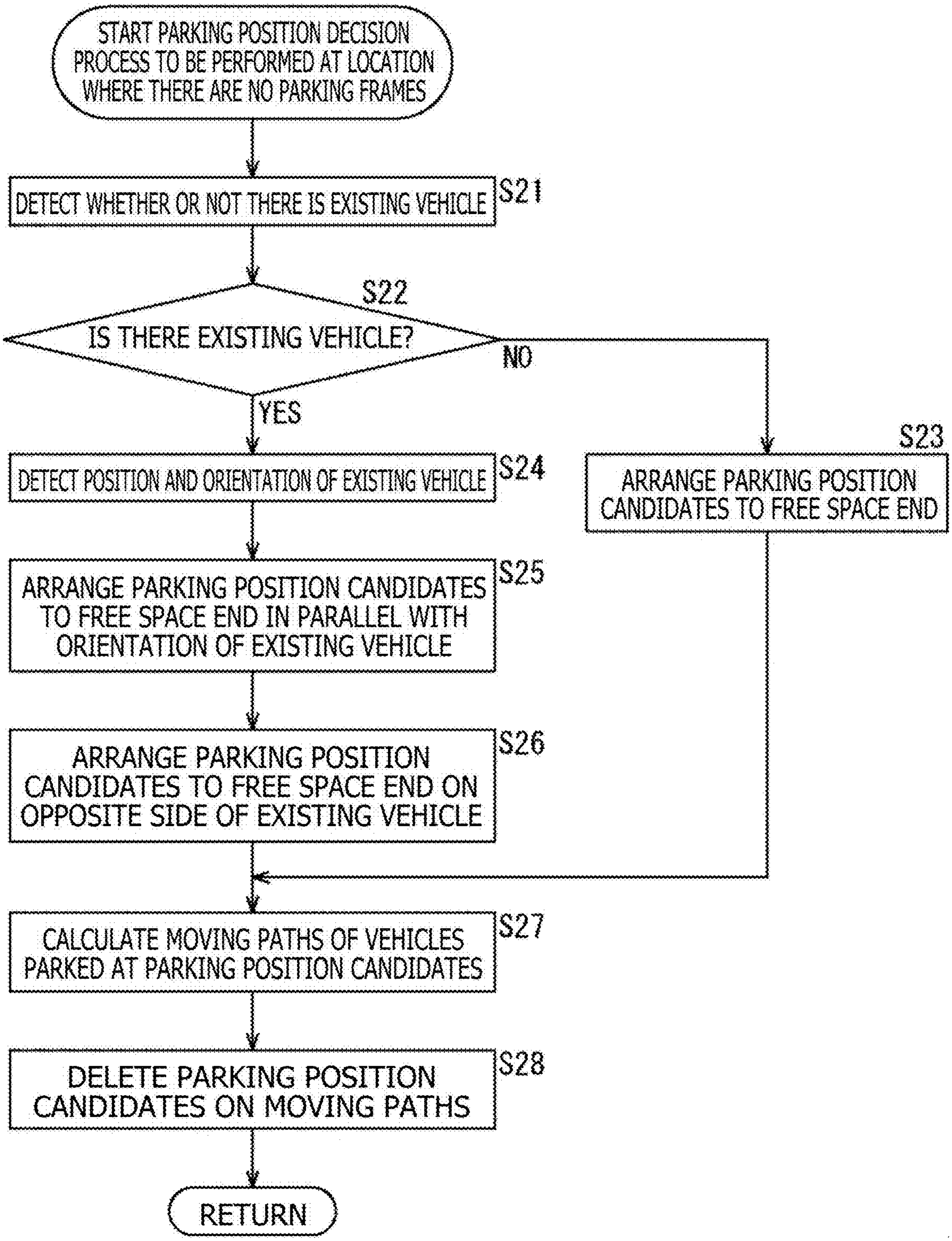
FIG. 8 is a flowchart for explaining a parking position decision process to be performed at a location where there are no parking frames, which is performed at Step S7 in FIG. 6.

FIG. 7 is a figure depicting an example of a screen displayed on the presenting section 222 in a case where there are no parking frames.

In a case where there are no parking frames, as depicted in FIG. 7, the presenting section 222 displays text representing that there are no parking frames found as text superimposed on the upper side of a captured image of the surroundings of the vehicle 1. In addition, a button for choosing whether to or not to move the vehicle forward, and continuing detection of a parking frame is displayed on the lower left side of the screen, and a button for choosing whether to or not to be proposed a recommended parking position decided on the basis of a free space detection result is displayed on the lower right side of the screen.

By choosing any of the buttons displayed on the presenting section 222, the user can choose to continue detection of a parking frame or to be proposed a recommended parking position in a state where there are no parking frames.

Returning to FIG. 6, at Step S5, the user input section 221 determines whether or not the user has chosen to be proposed a recommended parking position.

In a case where it is determined at Step S5 that the user has not chosen to be proposed a recommended parking position, and the user has chosen to continue detection of a parking frame, the process proceeds to Step S6. At Step S6, the operation control section 63 causes the vehicle 1 (subject vehicle) to move forward further, and the image recognizing section 211 continues the search in the free space. Thereafter, the process returns to Step S2, and the subsequent process is performed. Note that, in a case where the user has not chosen to be proposed a recommended parking position and has not chosen to continue detection of a parking frame, for example, the process performed by the vehicle control system 11 ends.

On the other hand, in a case where it is determined at Step S5 that the user has chosen to be proposed a recommended parking position, the process proceeds to Step S7. At Step S7, the vehicle control system 11 performs a parking position decision process to be performed at a location where there are no parking frames. By this parking position decision process, a recommended parking position in the free space is decided. Details of the parking position decision process to be performed at a location where there are no parking frames are mentioned later with reference to FIG. 8.

At Step S8, the presenting section 222 presents the recommended parking position. Details of a recommended parking position presentation method are mentioned later with reference to FIG. 10 and FIG. 11.

At Step S9, the user input section 221 accepts input of operation to choose a parking position by the user. The user input section 221 decides, as a parking position of the vehicle 1, the position chosen by the user, and the path calculating section 62 calculates a moving path of the vehicle 1 to the parking position.

At Step S10, the operation control section 63 performs a parking control operation. Specifically, the operation control section 63 causes the vehicle 1 to move to the parking position along the moving path calculated by the path calculating section 62, and stop there.

At Step S11, the presenting section 222 presents, to the user, a message that parking has been completed.

Note that, after the calculation of the moving path of the vehicle 1 to the parking position at Step S8, instead of the processes performed at Steps S11 and S12, the moving path to the parking position may be displayed on the presenting section 222. The user can check the moving path displayed on the presenting section 222, and manually park the vehicle 1 at the parking position. With reference to a flowchart in FIG. 8, the parking position decision process to be performed at a location where there are no parking frames performed at Step S7 in FIG. 6 is explained.

At Step S21, on the basis of sensor data of the external recognition sensor 25, the image recognizing section 211 detects whether or not there is an existing vehicle in the parking lot.

At Step S22, the image recognizing section 211 determines whether or not there is an existing vehicle in the parking lot.

In a case where it is determined at Step S22 that there are no existing vehicles, at Step S23, the parking position candidate setting section 241 imaginarily arranges parking position candidates to an end of the free space (to an end of the parking lot). For example, the parking position candidate setting section 241 arranges the parking position candidates such that the parking density is maximized.

On the other hand, in a case where it is determined at Step S22 that there is an existing vehicle, at Step S24, the distance-measurement/space-calculating section 212 detects the position and orientation of the existing vehicle.

At Step S25, the parking position candidate setting section 241 imaginarily arranges parking position candidates to an end of the free space in parallel with the orientation of the existing vehicle.

At Step S26, the parking position candidate setting section 241 imaginarily arranges parking position candidates to an end of the free space on the opposite side of the existing vehicle. By the processes at Steps S25 and S26, for example, the parking position candidates are arranged such that the parking density is maximized.

After the process at Step S23 or Step S26 is performed, at Step S27, the path calculating section 62 calculates a moving path for a vehicle parked at each parking position candidate to exit from the free space.

At Step S28, the parking position candidate adjusting section 243 adjusts the parking position candidates by deleting, from candidates to be proposed to the user as parking positions, parking position candidates arranged on the moving path of a vehicle parked at each parking position candidate.

Figure 9:
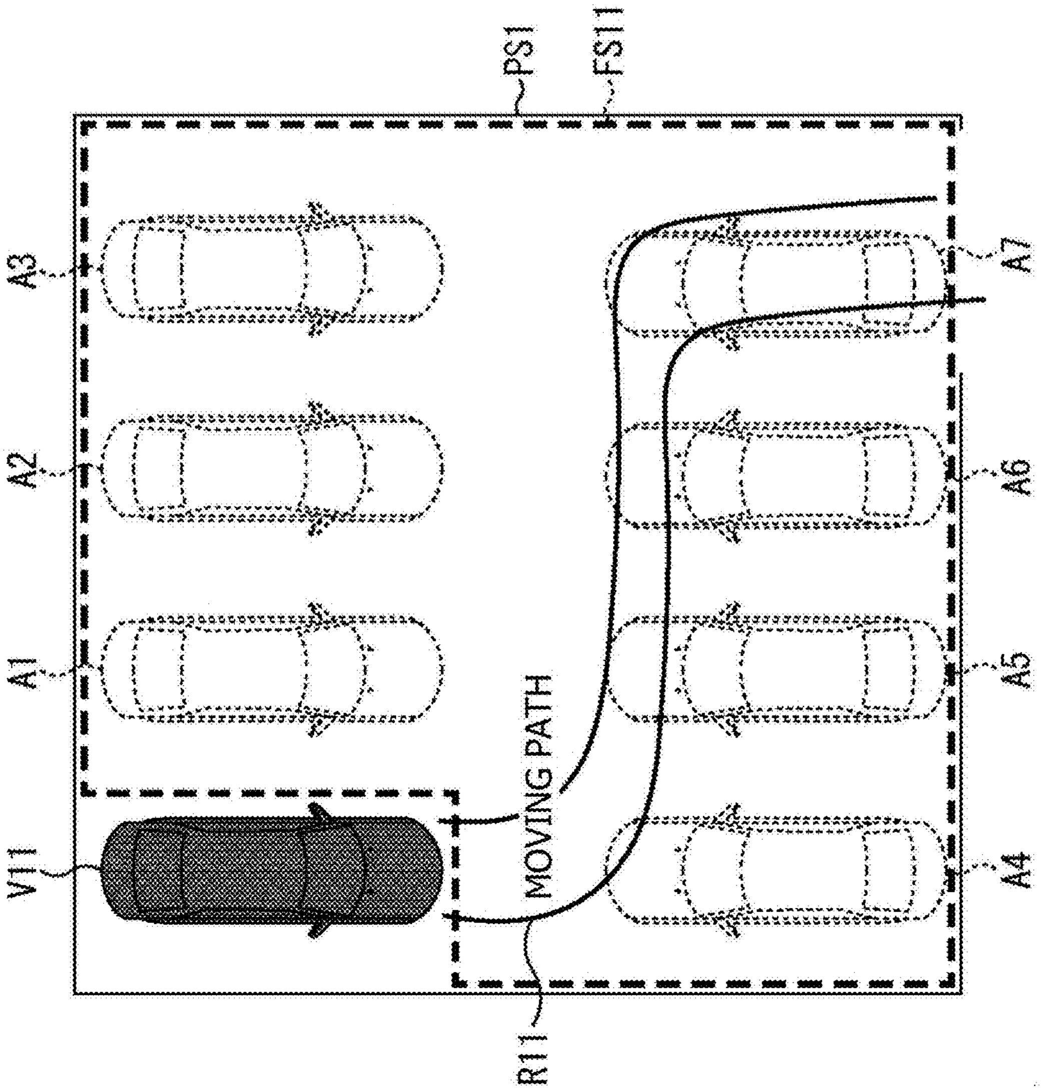
FIG. 9 is a figure depicting an example of parking position candidates.

FIG. 9 is a figure depicting an example of parking position candidates.

It is supposed that there is an existing vehicle V11 parked on the upper left side of a parking lot PS1 as depicted in FIG. 9. In this case, a flat surface in the parking lot PS1 where the existing vehicle V11 is not parked is a free space FS11 as represented by a broken line surrounding it. For example, parking position candidates A1 to A7 are arranged in the free space FS11 depending on the position and orientation of the existing vehicle V11. In the example depicted in FIG. 9, in the free space FS11, the parking position candidates A1 to A3 are arranged in parallel with the orientation of the existing vehicle V11 (next to each other in parallel with the forward moving direction (backward moving direction) of the existing vehicle V11). In addition, in the free space FS11, the parking position candidates A4 to A7 are arranged in parallel with the orientation of the existing vehicle V11 on the opposite side of the existing vehicle V11. A parked vehicle is imaginarily arranged in each of the parking position candidates A1 to A7.

The sizes of the vehicles parked at the parking position candidates A1 to A7 are specified on the basis of the vehicle information stored on the storage section 242. For example, the intervals between adjacent vehicles, and the size of each vehicle are preset.

After the parking position candidates A1 to A7 are arranged in the free space FS11, a moving path R11 for the existing vehicle V11 to exit from the parking lot PS1 is calculated by the path calculating section 62. Since the parking position candidates A4 to A7 are arranged on the moving path R11, the parking position candidates A4 to A7 are deleted from candidates to be proposed to the user as parking positions. Similarly, moving paths for the vehicles parked at the parking position candidates A1 to A3 to exit from the free space FS11 are calculated by the path calculating section 62, and, in a case where a parking position candidate is arranged on each moving path, the parking position candidate is deleted from candidates to be proposed to the user as parking positions.

From the multiple thus-obtained parking position candidates A1 to A3, the parking position candidate adjusting section 243 chooses a recommended parking position on the basis of predetermined priorities. The priorities are set depending on the distances between parking position candidates and an existing vehicle, the sizes of the clearances on the sides of vehicles parked at parking position candidates, the degrees of difficulty of exiting, and the like. For example, the parking position candidate adjusting section 243 chooses, as a recommended parking position, a position that allows an occupant to board and alight easily or allows the vehicle 1 to exit easily because the position is away from the existing vehicle, and ensures a sufficient clearance around the vehicle 1 even if vehicles to come afterwards are parked, and also because there are no obstacles around the vehicle 1.

After the recommended parking position is chosen, the process returns to Step S7 in FIG. 6, the subsequent process is performed, and the recommended parking position is presented to the user.

Figure 10:
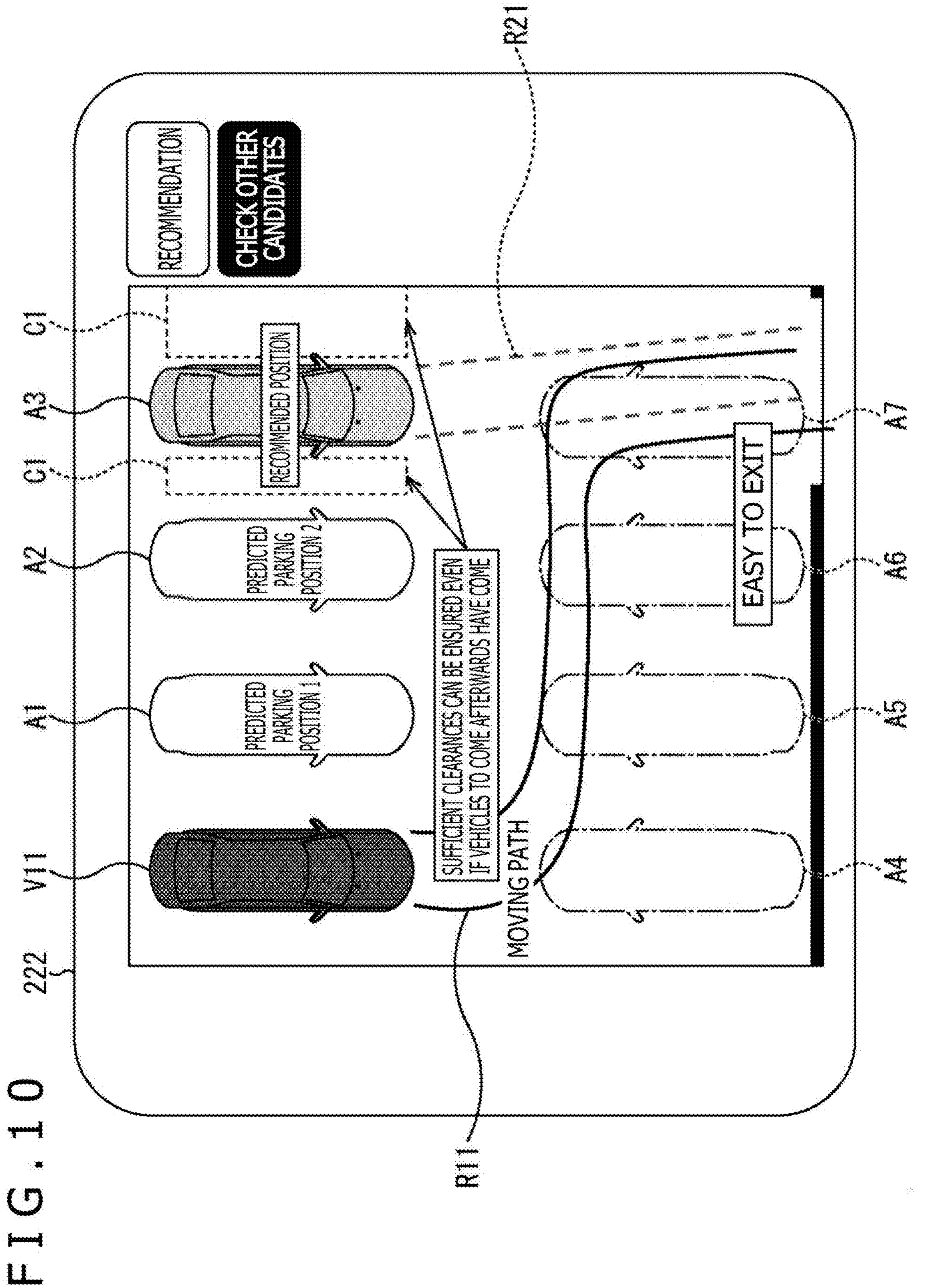
FIG. 10 is a figure depicting an example of a screen to present a recommended parking position.

FIG. 10 is a figure depicting an example of a screen to present the recommended parking position.

For example, it is supposed that the parking position candidate A3 in the parking position candidates A1 to A7 in FIG. 9 is chosen as the recommended parking position. As depicted in FIG. 10, the screen to present the recommended parking position displays a plan view of the parking lot PS1 including the free space FS11. The plan view of the parking lot PS1 displays information that the existing vehicle V11 is parked, and the parking position candidate A3 is the recommended parking position. For example, the parking position candidate A3 as the recommended parking position is displayed being highlighted.

In addition, the plan view of the parking lot PS1 displays, as predicted parking positions of vehicles to come afterwards, the parking position candidates A1 and A2 not chosen as the recommended parking position. The screen to present the recommended parking position displays reasons for recommending the recommended parking position, along with the parking positions.

In the example depicted in FIG. 10, as a reason for recommending the recommended parking position, the screen displays information that, in a case where the vehicle 1 is parked at the parking position candidate A3, sufficient clearances C1 can be ensured on the sides of the vehicle 1 even if a vehicle to come afterwards is parked adjacently. In addition, as a reason for recommending the recommended parking position, the screen displays information that it is easy to exit. The clearances C1 on the sides of the vehicle 1, and a moving path R21 for the vehicle 1 to exit from the free space FS11 related to the respective recommendation reasons in a case where the vehicle 1 is parked at the parking position candidate A3 also are displayed along with the recommendation reasons.

A parking position preferable for the user in the multiple parking position candidates is considered to change depending on the circumstance of the parking lot, the circumstance of occupants, and the destination after alighting. The user can check the reasons for recommending the recommended parking position displayed on the presenting section 222, and, in a case where the recommended parking position is preferable as a parking position, choose the recommended parking position as a parking position. In a case where another parking position candidate is more preferable as a parking position, the user can choose the preferable parking position candidate as a parking position.

Furthermore, on the flat surface of the parking lot PS1, the parking position candidates A4 to A7 deleted from the candidates to be proposed to the user as parking positions are displayed. By performing predetermined operation, the user can switch from the screen to present the recommended parking position to a screen to present parking position candidates inappropriate as a parking position.

Figure 11:
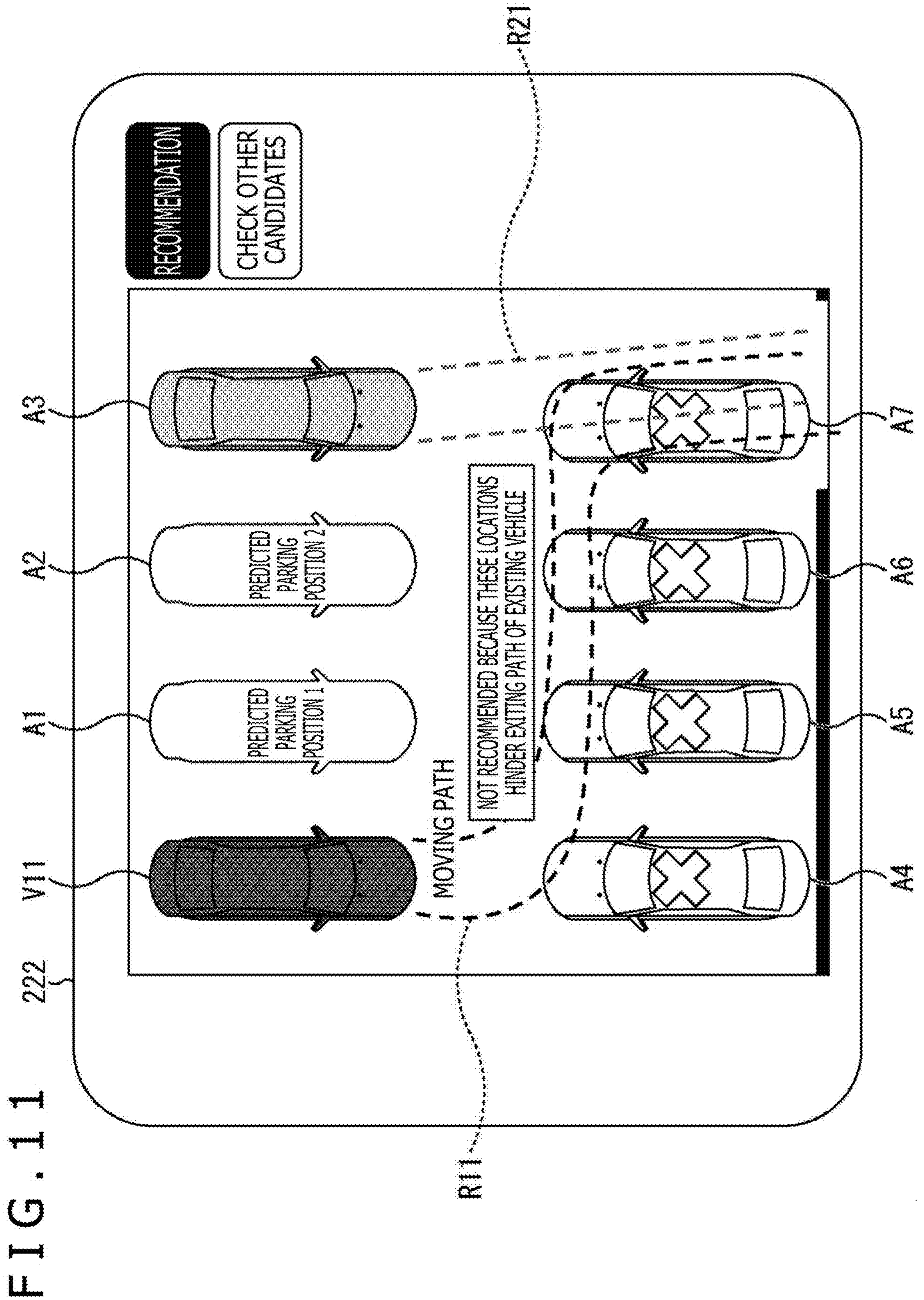
FIG. 11 is a figure depicting an example of a screen to present parking position candidates inappropriate as a parking position.

FIG. 11 is a figure depicting an example of the screen to present parking position candidates inappropriate as a parking position. Here, the parking position candidates A4 to A7 are inappropriate as a parking position. In view of this, marks representing inappropriate parking position candidates are displayed at the positions of A4 to A7.

The screen to present the parking position candidates inappropriate as a parking position displays a reason why the parking position candidates A4 to A7 are not recommended as a parking position as depicted in FIG. 11. In the example depicted in FIG. 11, a situation where the parking position candidates A4 to A7 are at locations that hinder the moving path of the existing vehicle V11 at the time of exiting is displayed as a reason for not recommending the parking position candidates A4 to A7 as a parking position. The moving path R11 of the existing vehicle V11 related to the reason also is displayed along with the reason.

For example, the parking position candidates A4 to A7 on the screen to present the parking position candidates inappropriate as a parking position are displayed being more highlighted than the parking position candidates A4 to A7 on the screen to present the recommended parking position in FIG. 10 are.

The user can look at the screen to present the parking position candidates inappropriate as a parking position, and check why the parking position candidates other than the recommended parking position are inappropriate as a parking position. The user can choose a parking position after checking the parking position candidates inappropriate as a parking position, and the reason why the parking position candidates are inappropriate.

Note that the presenting section 222 can also present, to the user, the reasons for recommending the recommended parking position, the reasons why the parking position candidates other than the recommended parking position are inappropriate as a parking position, and the like not by displaying them, but by another approach such as sound output.

As mentioned above, as a recommended parking position, the vehicle control system 11 can propose, to a driver, such a location that the ease of parking for vehicles to come afterwards, and the use efficiency of the free space are not impaired in the free space where there are no parking frames such as white lines.

By allowing an inexperienced driver to check a recommended parking position proposed from the vehicle control system 11, it becomes possible to reduce occasions where the driver cannot decide a parking position in a free space. Since parking position candidates are arranged such that the parking density in a free space is maximized, it becomes possible to prevent such parking that excessive clearances are ensured between the vehicle 1 and adjacent existing vehicles, and to enhance the use efficiency of the free space.

3. Second Embodiment

Figure 12:
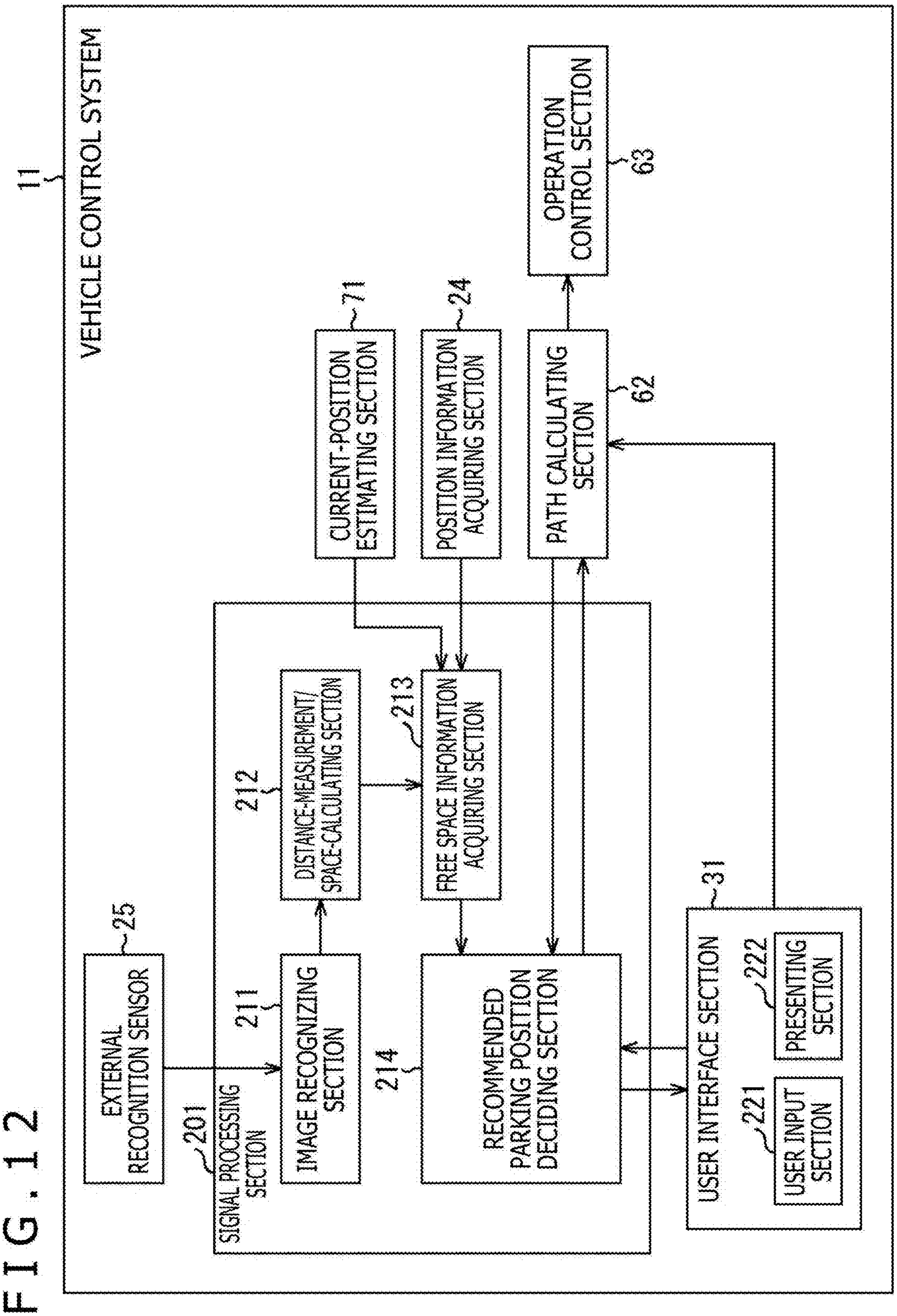
FIG. 12 is a block diagram depicting a configuration example of the vehicle control system according to a second embodiment of the present technology.

FIG. 12 is a block diagram depicting a configuration example of the vehicle control system 11 according to a second embodiment of the present technology. Constituent elements in FIG. 12 that are the same as constituent elements in FIG. 3 are given identical reference signs. Overlapping explanations are omitted as appropriate.

The configuration of the vehicle control system 11 depicted in FIG. 12 is different from the configuration of the vehicle control system 11 in FIG. 3 in that the user interface section 31 supplies preference information to the recommended parking position deciding section 214.

A user can input in advance conditions regarding parking positions which are preferable to her/himself as preference information via the user input section 221. The preference information represents preferences of the user regarding the size of the space around the vehicle 1, a walking path of the user to a facility associated with a free space (parking lot), and the like.

Figure 13:
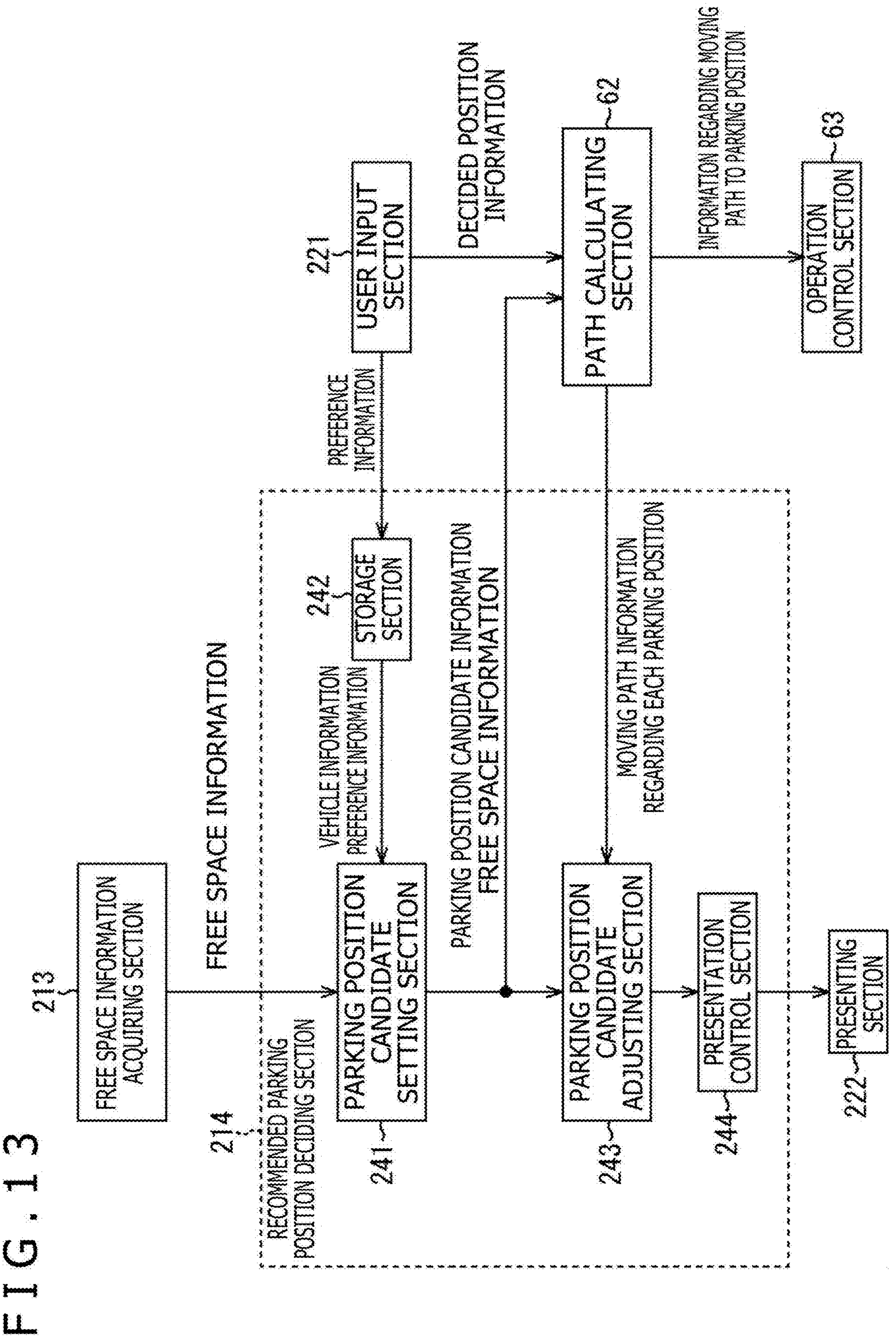
FIG. 13 is a block diagram depicting a detailed configuration of portions related to decision of a recommended parking position.

FIG. 13 is a block diagram depicting a detailed configuration of portions related to decision of a recommended parking position. Constituent elements in FIG. 13 that are the same as constituent elements in FIG. 5 are given identical reference signs. Overlapping explanations are omitted as appropriate.

The configuration depicted in FIG. 13 is different from the configuration in FIG. 5 in that the user input section 221 supplies the preference information to the storage section 242.

Along with the information representing the shape of the free space, information representing whether or not there is an existing vehicle, and information representing the position and orientation of the existing vehicle, the free space information acquiring section 213 acquires environment information as free space information. For example, the environment information includes information representing the positions of puddles or obstacles in the free space, and information representing the position of a facility such as a store associated with the free space.

The preference information supplied from the user input section 221 is stored on the storage section 242.

The parking position candidate setting section 241 acquires the vehicle information and the preference information from the storage section 242, and sets multiple parking position candidates on the basis of the vehicle information, the preference information, and the free space information.

FIG. 14 is a figure depicting examples of preference information.

As depicted in FIG. 14, conditions to be set regarding parking positions preferable to a user are that the space on the side of the driver's seat is made larger than the space on the side of the passenger seat, the space on the side of the passenger seat is made larger than the space on the side of the driver's seat, the space on the side of the driver's seat and the space on the side of the passenger seat are made equal to each other, that the space on the side of the rear of the vehicle 1 is made large such that the back door or trunk can be opened, and the like. In addition, conditions to be set regarding parking positions preferable to the user are that it is sufficient if the spaces on the left side and on the right side (on the side of the driver's seat and on the side of the passenger seat) have minimum sizes that allow occupants to board and alight from the vehicle, that the space on the side of the driver's seat is allowed to be too small to board and alight, that the space on the side of the passenger seat is allowed to be too small to board and alight, that it is better if occupants can easily move from a position to a store associated with a parking lot, that it is better if a space where occupants board and alight is far from an obstacle, that there is not a puddle in a space where occupants board and alight, and the like.

For example, in a case where a condition that is set regarding parking positions preferable to the user is that the space on the side of the driver's seat is made larger than the space on the side of the passenger seat, the parking position candidate setting section 241 arranges parking position candidates in the free space making the space on the side of the driver's seat of each parking position candidate larger than its space on the side of the passenger seat.

Although not depicted in FIG. 13, it is also possible that the parking position candidate adjusting section 243 acquires the preference information from the storage section 242, and chooses a recommended parking position on the basis of the preference information from multiple parking position candidates set by the parking position candidate setting section 241.

Figure 15:
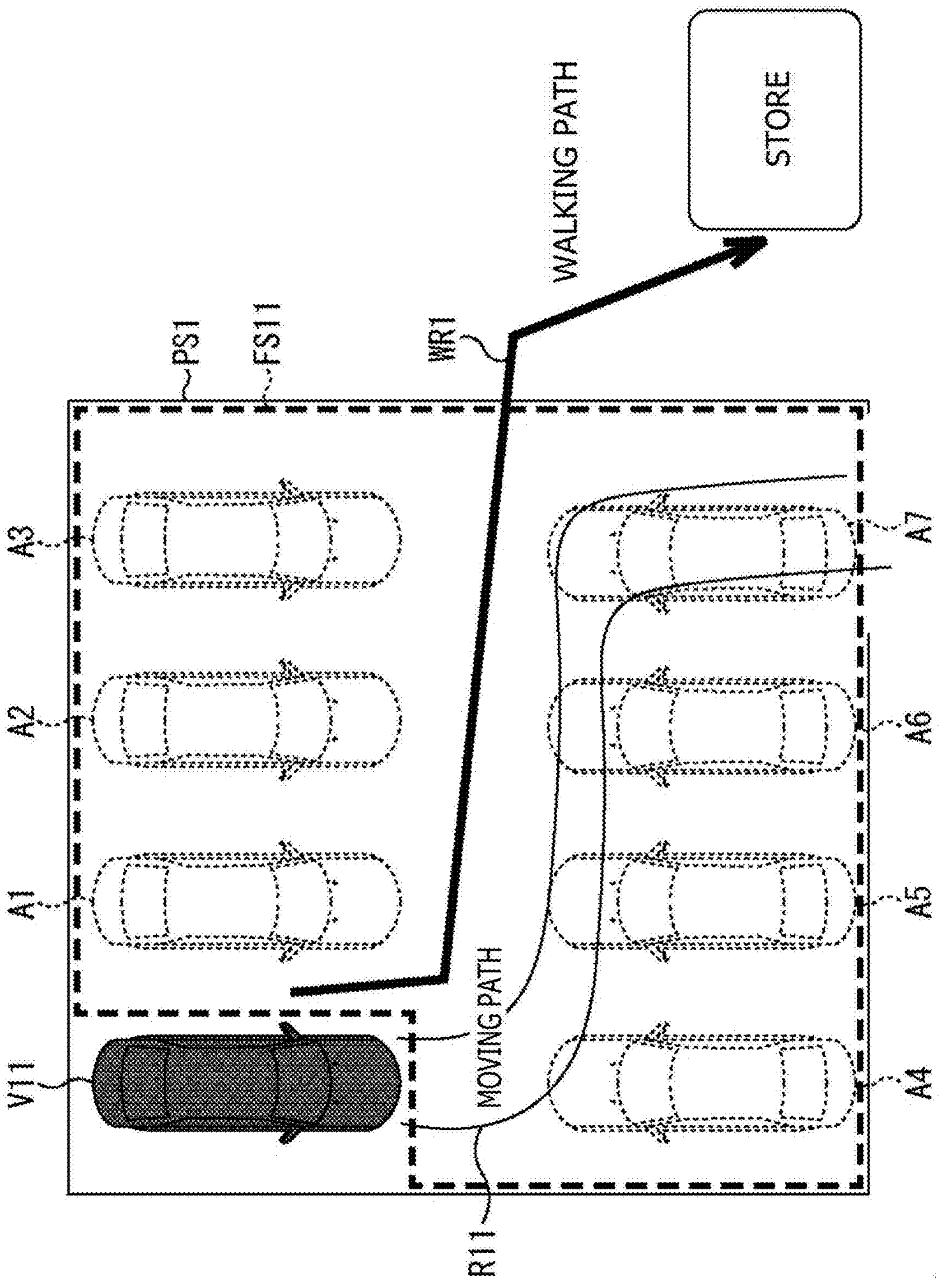
FIG. 15 is a figure for explaining an example of a recommended parking position choosing method.

FIG. 15 is a figure for explaining an example of a recommended parking position choosing method.

For example, it is supposed that a condition that is set regarding parking positions preferable for the user is that it is better if occupants can easily move from a position to a store associated with a free space. In this case, as depicted in FIG. 15, the path calculating section 62 calculates a walking path WR1 to a store to be followed by an occupant in a case where the vehicle 1 is parked at the parking position candidate A1. Similarly, the path calculating section 62 calculates an occupant walking path to be followed in a case where the vehicle 1 is parked at each of the parking position candidates A2 to A7.

As mentioned above, from the multiple parking position candidates A1 to A3 obtained on the basis of the moving path of the existing vehicle V11, or the like, the parking position candidate adjusting section 243 chooses a recommended parking position on the basis of the occupant walking paths to be followed in a case where the vehicle 1 is parked at the respective parking position candidates. For example, the parking position candidate adjusting section 243 chooses, as a recommended parking position, the parking position candidate A3 with the shortest occupant walking path.

Note that after the parking position candidate adjusting section 243 performs the adjustment of the parking position candidates, walking paths to be followed in a case where the vehicle 1 is parked at parking position candidates determined as candidates to be proposed to the user as parking positions may be calculated by the path calculating section 62.

Figure 16:
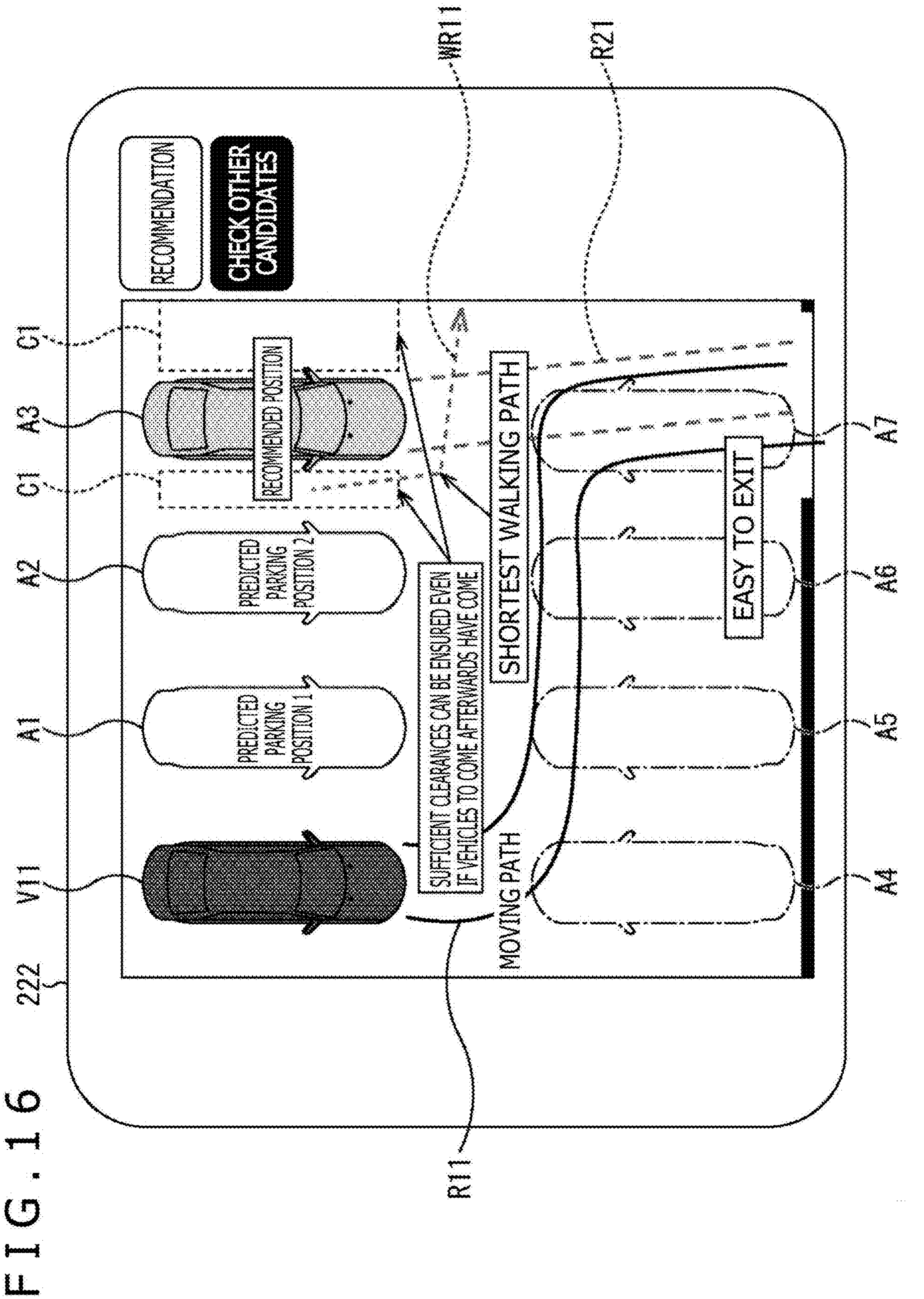
FIG. 16 is a figure depicting an example of a screen to present a recommended parking position chosen on the basis of preference information.

FIG. 16 is a figure depicting an example of a screen to present a recommended parking position chosen on the basis of preference information.

As depicted in FIG. 16, the screen to present the recommended parking position displays, as a reason for recommending the recommended parking position, information that the walking path from the recommended parking position is the shortest, along with the content explained with reference to FIG. 10. A walking path WR11 that is related to this recommendation reason, and is for heading toward a store from the parking position candidate A3 also is displayed along with the recommendation reason.

As mentioned above, it becomes possible for the vehicle control system 11 to propose a recommended parking position satisfying conditions that a user wishes to be satisfied regarding parking positions. For example, since a clearance with a size that the user wishes is ensured, it is possible to reduce stress that the user feels at the time of boarding and alighting.

4. Third Embodiment

Figure 17:
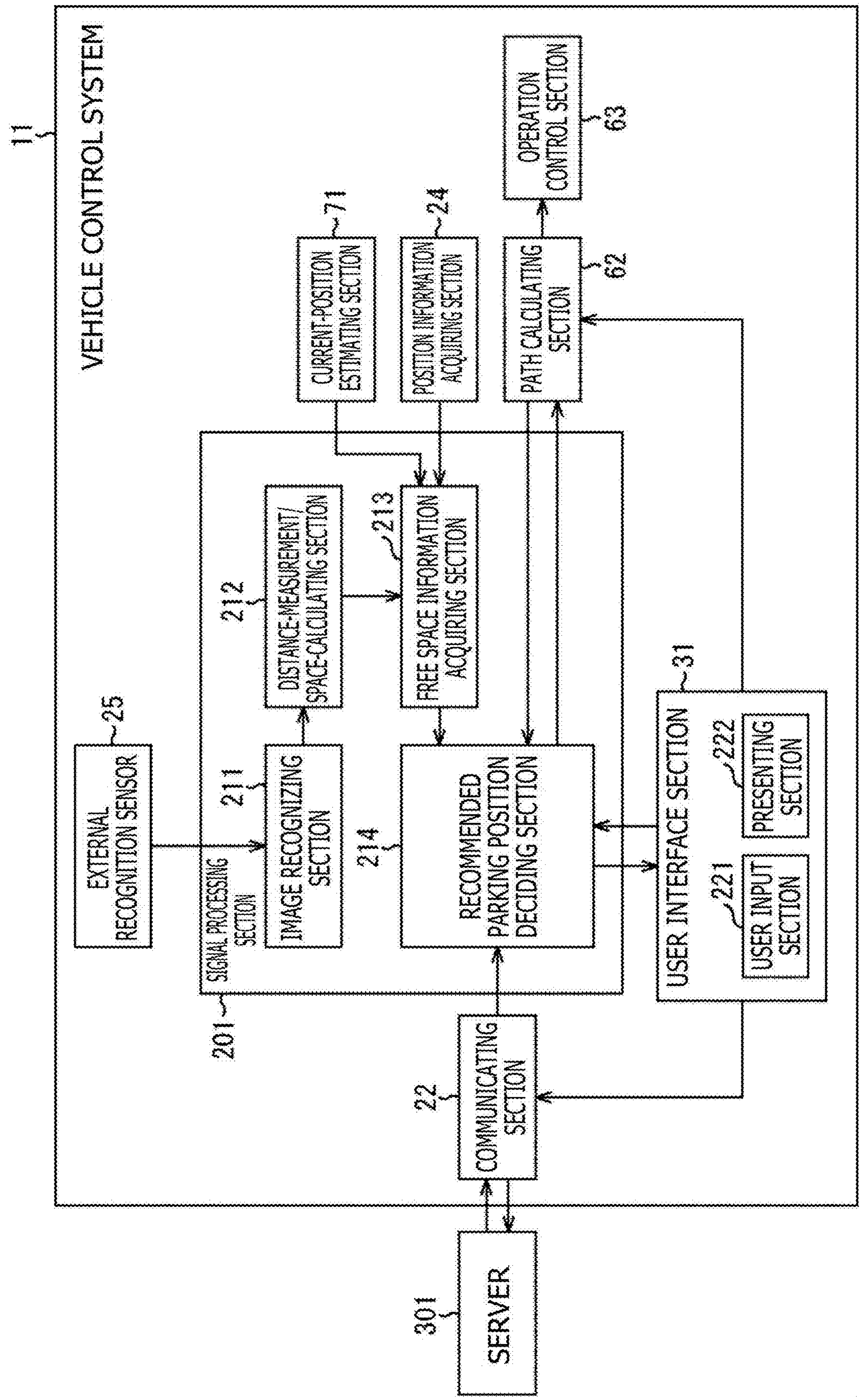
FIG. 17 is a block diagram depicting a configuration example of the vehicle control system according to a third embodiment of the present technology.

FIG. 17 is a block diagram depicting a configuration example of the vehicle control system 11 according to a third embodiment of the present technology. Constituent elements in FIG. 17 that are the same as constituent elements in FIG.

12 are given identical reference signs. Overlapping explanations are omitted as appropriate.

The configuration of the vehicle control system 11 depicted in FIG. 17 is different from the configuration of the vehicle control system 11 in FIG. 12 in that the communicating section 22 is provided.

The communicating section 22 communicates with a server 301 that manages vehicles parked at a parking lot. Specifically, the communicating section 22 receives management information transmitted from the server 301, and supplies the management information to the recommended parking position deciding section 214.

The management information includes history information and visit plan information. For example, the history information includes the sizes of vehicles parked in past times at a parking lot including a free space around the vehicle 1, and preference information regarding users of the vehicles. For example, the visit plan information includes the sizes of vehicles to be parked in future times at the parking lot including the free space around the vehicle 1, and preference information regarding users of the vehicles.

In addition, along with information representing a parking lot where the vehicle 1 is to be parked in a future time, the communicating section 22 transmits, to the server 301, the preference information supplied from the user interface section 31. For example, when a facility is chosen as a destination by a user via the user input section 221, the communicating section 22 transmits, to the server 301, information representing a parking lot of the facility as information representing a parking lot where the vehicle 1 is to be parked in a future time. The information transmitted by the communicating section 22 is managed by the server 301 as the visit plan information and the history information.

Figure 18:
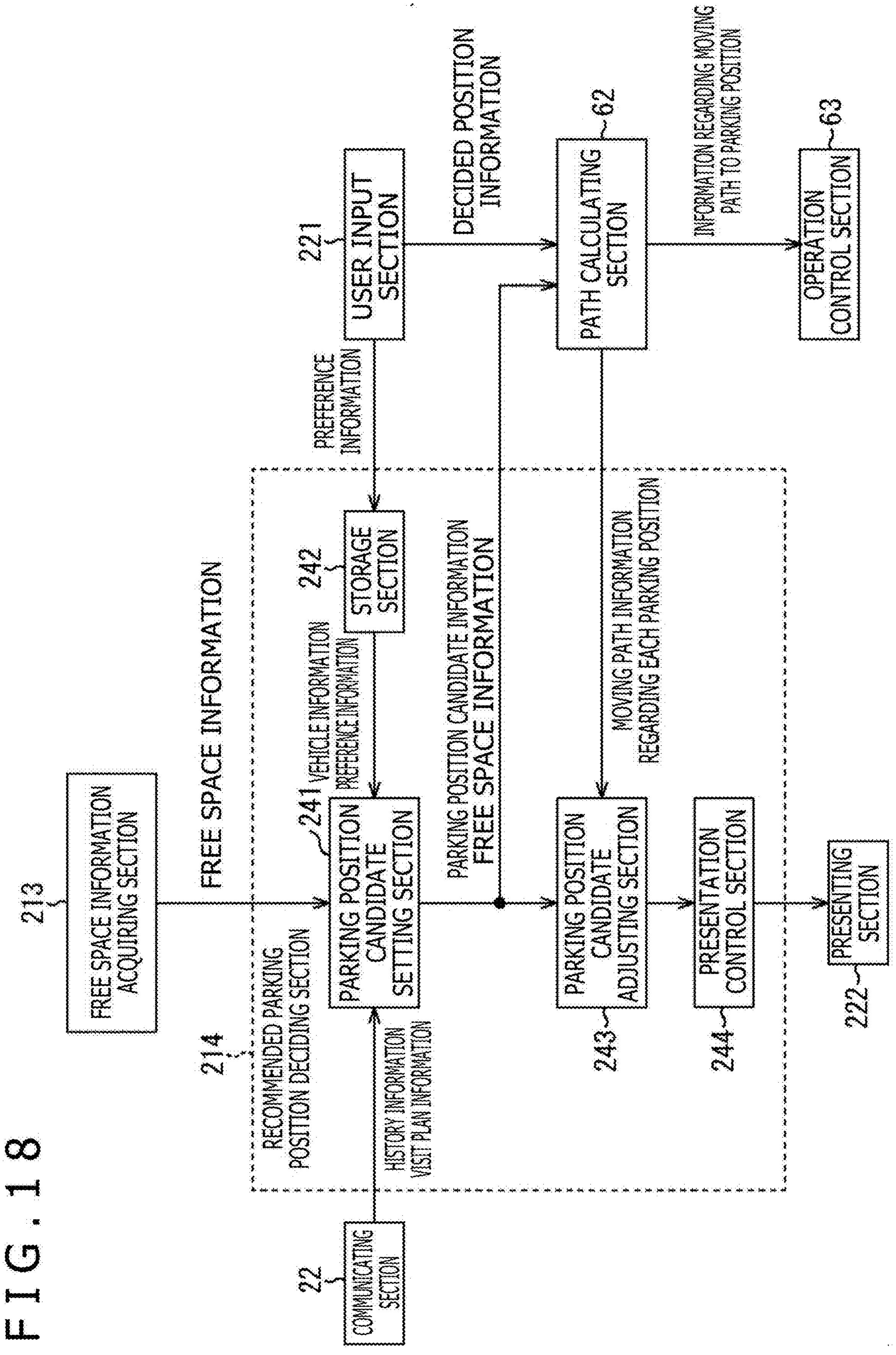
FIG. 18 is a block diagram depicting a detailed configuration of portions related to decision of a recommended parking position.

FIG. 18 is a block diagram depicting a detailed configuration of portions related to decision of a recommended parking position. Constituent elements in FIG. 17 that are the same as constituent elements in FIG. 13 are given identical reference signs. Overlapping explanations are omitted as appropriate.

The configuration depicted in FIG. 18 is different from the configuration in FIG. 13 in that the communicating section 22 supplies the history information and the visit plan information to the parking position candidate setting section 241.

The parking position candidate setting section 241 sets multiple parking position candidates on the basis of the history information and the visit plan information supplied from the communicating section 22. Specifically, the parking position candidate setting section 241 sets the parking position candidates by imaginarily arranging the vehicle 1 and vehicles with sizes represented by the history information and the visit plan information.

Since vehicle information regarding vehicles to come afterwards of each parking lot including a free space is managed comprehensively at the server 301, the parking position candidate setting section 241 can set such parking position candidates that the vehicle arrangement in a free space is optimized on the basis of the specific sizes of vehicles to come afterwards.

Since preference information regarding users of the vehicles to come afterwards is also managed at the server 301, the parking position candidate setting section 241 can set such parking position candidates that the vehicle arrangement in the free space is optimized on the basis of the attributes of the users of the vehicles to come afterwards. For example, in a case where a user of a vehicle to come afterwards uses a wheelchair, the parking position candidate setting section 241 can set such parking position candidates that the vehicle arrangement in the free space is optimized while a space for the wheelchair to board and alight from the vehicle to come afterwards is ensured. Similar careful consideration can be given also in a case where a user of a vehicle to come afterwards uses a stroller.

In addition, by communicating preference information regarding the user of the vehicle 1 to a vehicle that is parked in a destination parking lot earlier than the vehicle 1 through the server 301, for example, it becomes possible to prevent a situation where the user of the vehicle 1 has difficulty at the time of boarding and alighting for a reason that the clearance between the vehicle parked earlier and the vehicle 1 is too small.

5. Fourth Embodiment

Figure 19:
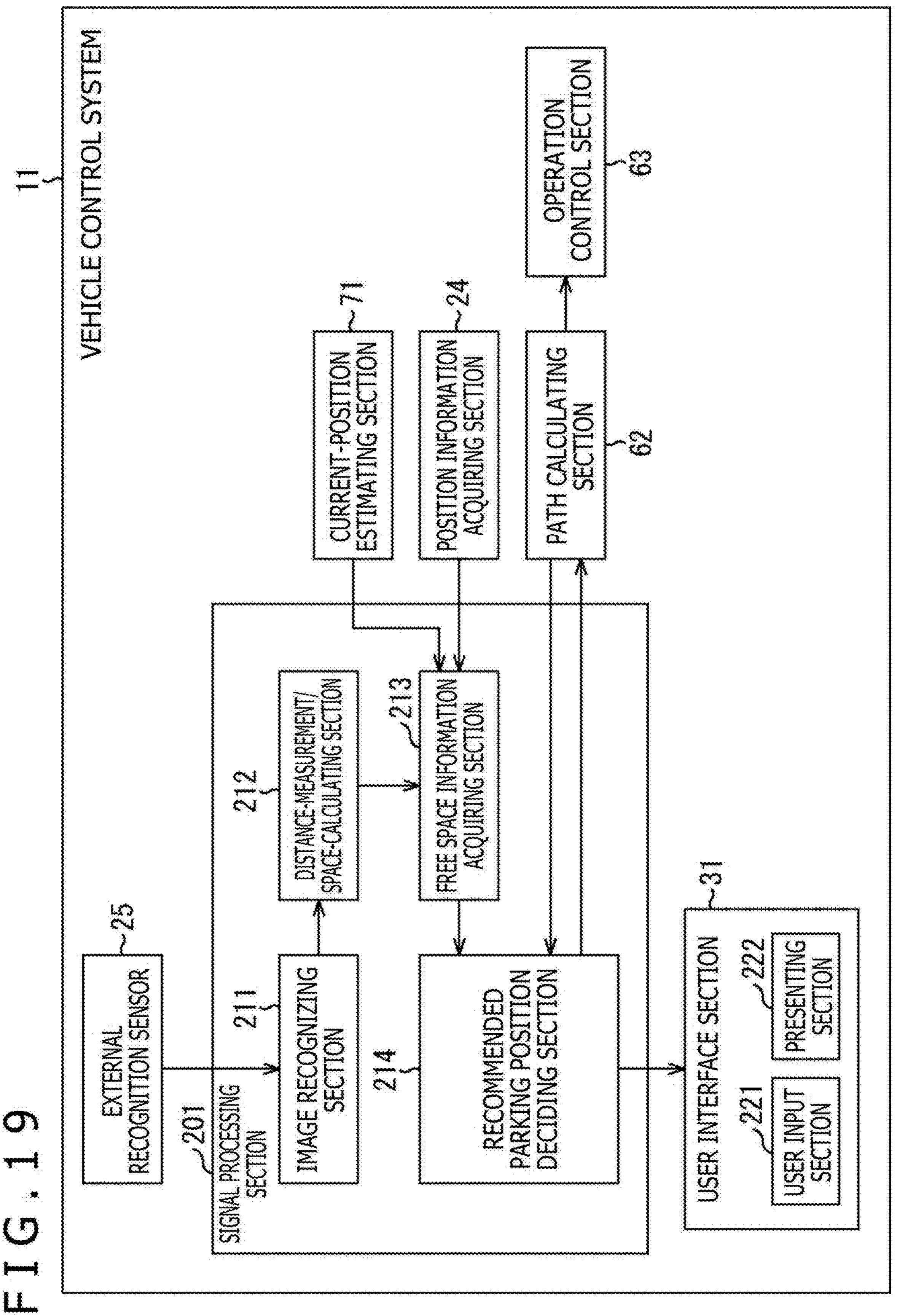
FIG. 19 is a block diagram depicting a configuration example of the vehicle control system according to a fourth embodiment of the present technology.

FIG. 19 is a block diagram depicting a configuration example of the vehicle control system 11 according to a fourth embodiment of the present technology. Constituent elements in FIG. 19 that are the same as constituent elements in FIG. 3 are given identical reference signs. Overlapping explanations are omitted as appropriate.

The configuration of the vehicle control system 11 depicted in FIG. 19 is different from the configuration of the vehicle control system 11 in FIG. 3 in that, instead of the user interface section 31, the recommended parking position deciding section 214 supplies decided position information to the path calculating section 62.

Figure 20:
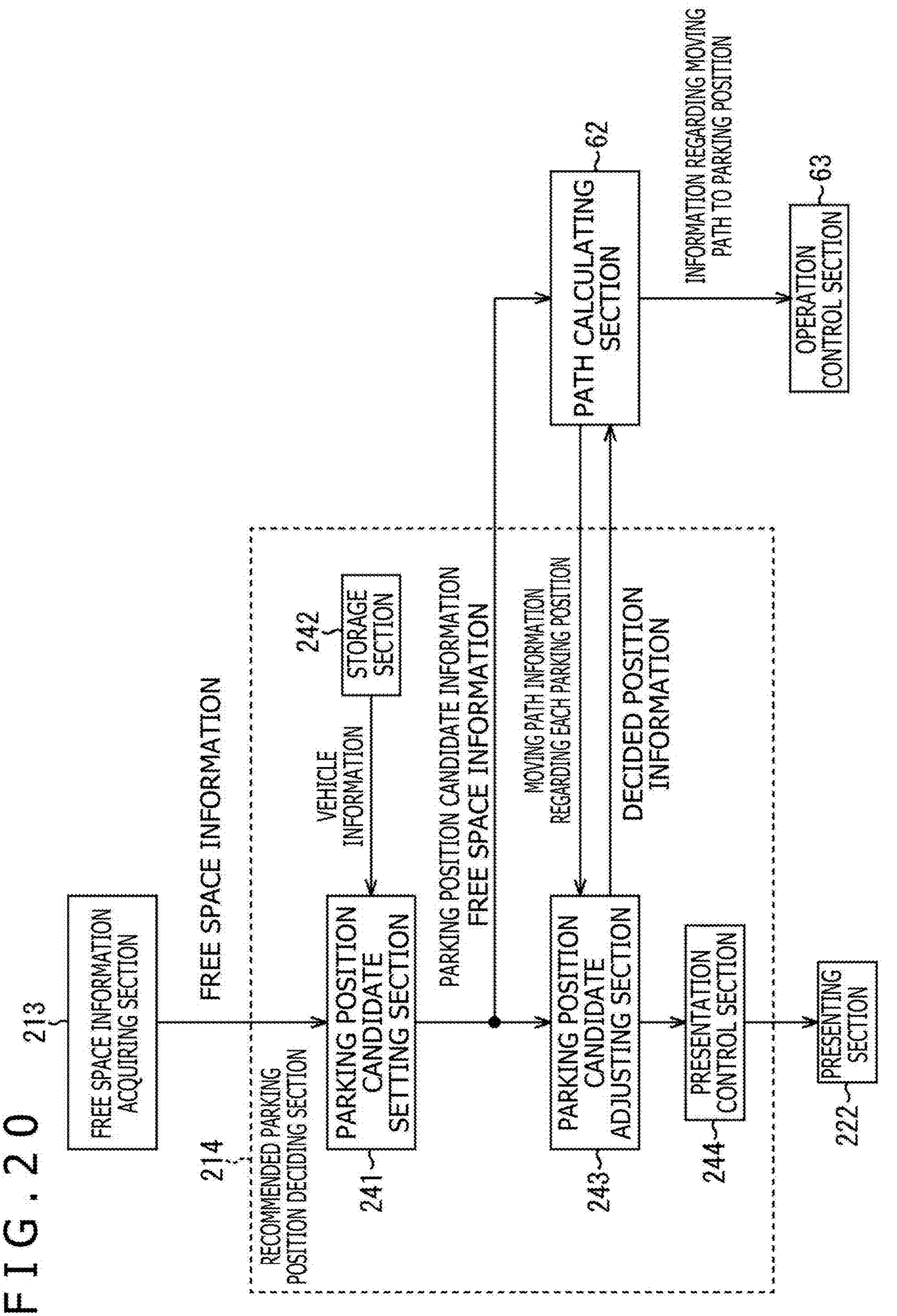
FIG. 20 is a block diagram depicting a detailed configuration of portions related to decision of a recommended parking position.

FIG. 20 is a block diagram depicting a detailed configuration of portions related to decision of a recommended parking position. Constituent elements in FIG. 20 that are the same as constituent elements in FIG. 5 are given identical reference signs. Overlapping explanations are omitted as appropriate.

The configuration depicted in FIG. 20 is different from the configuration in FIG. 5 in that the parking position candidate adjusting section 243 of the recommended parking position deciding section 214 supplies decided position information to the path calculating section 62.

The parking position candidate adjusting section 243 sets a recommended parking position as a parking position of the vehicle 1. Here, the parking position candidate adjusting section 243 functions as a deciding section that decides a parking position of the vehicle 1. The parking position candidate adjusting section 243 supplies, to the path calculating section 62, decided position information that the recommended parking position is a parking position.

The path calculating section 62 calculates a moving path of the vehicle 1 to the parking position represented by the decided position information supplied from the parking position candidate adjusting section 243.

As mentioned above, a parking position of the vehicle 1 may not be set by a user, but may be set by the vehicle control system 11. Note that, in the second embodiment and the third embodiment also, it is possible that the vehicle control system 11 sets a parking position of the vehicle 1.

6. Modification Example

<Example of Application to Moving Body>

The present technology can be applied to a variety of products. For example, the present technology may be realized as an apparatus related to stop operation of a moving body of any type such as a car, an electric car, a hybrid electric car, a motorcycle, a bicycle, a personal mobility, an airplane, a drone, a ship, or a robot.

<About Computer>

The series of processing mentioned above can also be executed by hardware or can also be executed by software. In a case where the series of processing is executed by software, a program included in the software is installed on a computer incorporated into dedicated hardware, a general-purpose personal computer or the like from a program recording medium.

Figure 21:
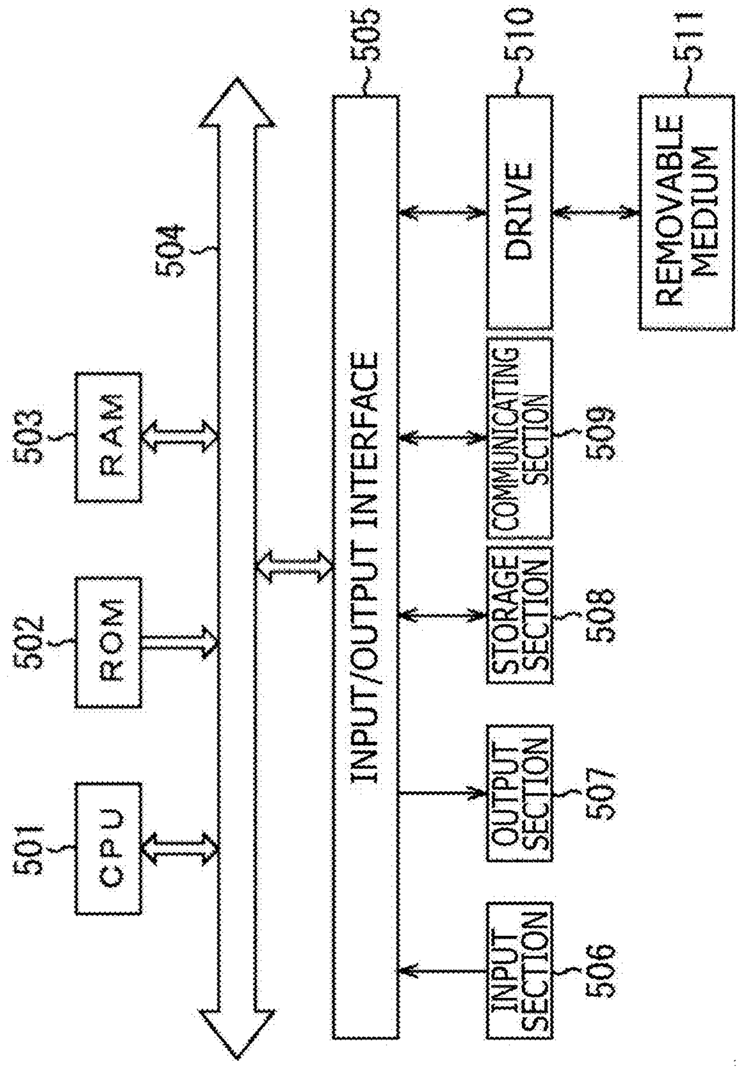
FIG. 21 is a block diagram depicting a configuration example of the hardware of a computer.

FIG. 21 is a block diagram depicting a configuration example of the hardware of a computer that executes the series of processing mentioned above in accordance with a program. For example, some of constituent elements of the vehicle control system 11 are configured using a PC having configuration similar to the configuration depicted in FIG. 21.

A CPU (Central Processing Unit) 501, a ROM (Read Only Memory) 502, and a RAM (Random Access Memory) 503 are interconnected by a bus 504.

The bus 504 is further connected with an input/output interface 505. The input/output interface 505 is connected with an input section 506 including a keyboard, a mouse, and the like, and an output section 507 including a display, a speaker, and the like. In addition, the input/output interface 505 is connected with a storage section 508 including a hard disk, a non-volatile memory, and the like, a communicating section 509 including a network interface and the like, and a drive 510 that drives a removable medium 511.

In the thus-configured computer, for example, the CPU 501 performs the series of processing mentioned above by loading a program stored on the storage section 508 via the input/output interface 505 and the bus 504 onto the RAM 503 and executing the program.

For example, the program executed by the CPU 501 is provided being recorded on the removable medium 511 or provided via a cable or wireless transfer medium like a local area network, the Internet, or digital broadcasting, and installed on the storage section 508.

The program executed by the computer may be a program that performs processes in a temporal sequence along the sequence explained in the present specification or may be a program that performs processes in parallel or at necessary timings such as timings when the processes are called.

Others

Note that, in the present specification, a system means a set of multiple constituent elements (apparatuses, modules (components), etc.), and it does not matter whether or not all the constituent elements are located in a single housing. Accordingly, multiple apparatuses housed in separate housings and connected via a network, and one apparatus with one housing having housed therein multiple modules are both systems.

Note that advantages described in the present specification are presented merely for illustrative purposes, but not for limiting the advantages. There may be advantages other than those described in the present specification.

Embodiments of the present technology are not limited to the embodiments mentioned above, but can be changed in various manners within the scope not departing from the gist of the present technology.

For example, the present technology can be configured as cloud computing in which one functionality is shared among multiple apparatuses via a network, and is processed by the multiple apparatuses in cooperation with each other.

In addition, other than being executed by one apparatus, each step explained in a flowchart mentioned above can be shared among and executed by multiple apparatuses.

Furthermore, in a case where one step includes multiple processes, other than being executed by one apparatus, the multiple processes included in the one step can be shared among and executed by multiple apparatuses.

Examples of Combinations of Configurations

The present technology can also adopt configurations like the ones below.

(1)

A signal processing apparatus including:

a candidate setting section that sets multiple stop position candidates as candidates of a stop position of a moving body in a free space around a subject moving body on the basis of free space information related to the free space; and a choosing section that chooses a recommended stop position recommended as the stop position of the subject moving body from the multiple stop position candidates.

(2)

The signal processing apparatus according to (1) above, further including:

a presentation control section that presents, to a user, at least either the multiple stop position candidates or the recommended stop position in the free space.

(3)

The signal processing apparatus according to (2) above, in which the presentation control section presents a reason for recommending the recommended stop position.

(4)

The signal processing apparatus according to (2) or (3) above, in which the presentation control section presents a reason why the stop position candidates not chosen as the recommended stop position by the choosing section are not recommended as the stop position of the subject moving body.

(5)

The signal processing apparatus according to any one of (1) to (4) above, in which the choosing section chooses the recommended stop position on the basis of a moving path of at least either a moving body already stopped in the free space or moving bodies to be stopped at the stop position candidates.

(6)

The signal processing apparatus according to any one of (1) to (5) above, in which the free space information includes information representing a position and orientation of a moving body already stopped in the free space, and the candidate setting section sets the stop position candidates depending on the position and orientation of the moving body already stopped in the free space.

(7)

The signal processing apparatus according to (6) above, in which the candidate setting section sets the stop position candidates which are arranged in parallel with the orientation of the moving body already stopped in the free space.

(8)

The signal processing apparatus according to any one of (1) to (6) above, in which the choosing section chooses the recommended stop position on the basis of preference information regarding a user.

(9)

The signal processing apparatus according to (8) above, in which the preference information represents a preference of the user about at least either a size of a space around the subject moving body or a moving path of the user to a facility associated with the free space.

(10)

The signal processing apparatus according to any one of (1) to (9) above, further including:

a communicating section that communicates with a server that manages a moving body to be stopped in the free space, in which the candidate setting section sets the stop position candidates on the basis of management information acquired from the server.

(11)

The signal processing apparatus according to (10) above, in which the management information includes at least either a size of a moving body stopped in the free space in a past time or preference information regarding a user of a moving body stopped in the free space in a past time.

(12)

The signal processing apparatus according to (10) or (11) above, in which the management information includes at least either a size of a moving body to be stopped in the free space in a future time or preference information regarding a user of a moving body to be stopped in the free space in a future time.

(13)

The signal processing apparatus according to any one of (10) to (12) above, in which the communicating section transmits, to the server, a size of the subject moving body and preference information regarding a user of the subject moving body, along with information representing a free space where the subject moving body is to be stopped in a future time.

(14)

The signal processing apparatus according to any one of (2) to (4) above, further including:

a deciding section that decides the stop position of the subject moving body; and a drive control section that causes the subject moving body to move to the stop position decided by the deciding section.

(15)

The signal processing apparatus according to (14) above, in which the deciding section decides, as the stop position of the subject moving body, a position chosen by the user from the multiple stop position candidates.

(16)

The signal processing apparatus according to (14) above, in which the deciding section decides the recommended stop position as the stop position of the subject moving body.

(17)

The signal processing apparatus according to any one of (2) to (4) above, in which the presentation control section presents a moving path to a position chosen by the user from the multiple stop position candidates.

(18)

The signal processing apparatus according to any one of (1) to (17) above, further including:

an acquiring section that acquires the free space information on the basis of an image acquired by capturing an image of a surrounding of the subject moving body.

(19)

A signal processing method including:

setting, by a signal processing apparatus, multiple stop position candidates as candidates of a stop position of a moving body in a free space around a subject moving body on the basis of free space information related to the free space; and choosing, by the signal processing apparatus, a recommended stop position recommended as the stop position of the subject moving body from the multiple stop position candidates.

(20)

A computer-readable recording medium having recorded thereon a program for executing processes of:

setting multiple stop position candidates as candidates of a stop position of a moving body in a free space around a subject moving body on the basis of free space information related to the free space; and choosing a recommended stop position recommended as the stop position of the subject moving body from the multiple stop position candidates.

(21)

A vehicle-mounted system having:

a signal processing apparatus including a candidate setting section that sets multiple parking position candidates as candidates of a parking position of a vehicle in a free space around a subject vehicle on the basis of free space information related to the free space; and a choosing section that chooses a recommended parking position recommended as the parking position of the subject vehicle from the multiple parking position candidates; and a presenting section that presents, to a user, at least either the multiple parking position candidates or the recommended parking position in the free space.

REFERENCE SIGNS LIST

1: Vehicle
11: Vehicle control system
22: Communicating section
24: Position information acquiring section
31: User interface section
62: Path calculating section
63: Operation control section
71: Current-position estimating section
201: Signal processing section
211: Image recognizing section
212: Distance-measurement/space-calculating section
213: Free space information acquiring section
214: Recommended parking position deciding section
221: User input section
222: Presenting section
241: Parking position candidate setting section
242: Storage section
243: Parking position candidate adjusting section
244: Presentation control section

The invention claimed is:

1. A signal processing apparatus comprising:

circuitry configured to set multiple stop position candidates as candidates of a stop position of a moving body in a free space around a subject moving body based on free space information related to the free space, calculate an exit moving path for at least either a moving body already stopped in the free space or moving bodies to be stopped at the stop position candidates to exit from the free space, delete, from the multiple stop position candidates, a stop position candidate that is arranged on the exit moving path, choose a recommended stop position recommended as the stop position of the subject moving body from the remaining stop position candidates, cause a display to display a stop position candidate that is not recommended based on the stop position candidate blocking an exit moving path, and control movement of the subject moving body to the recommended stop position based on a moving path calculated to the recommended stop position.

2. The signal processing apparatus according to claim 1, wherein the circuitry is further configured to present, to a user, at least either the multiple stop position candidates or the recommended stop position in the free space.

3. The signal processing apparatus according to claim 2, wherein the circuitry is further configured to present a reason for recommending the recommended stop position.

4. The signal processing apparatus according to claim 2, wherein the circuitry is further configured to present a reason why the stop position candidates not chosen as the recommended stop position by the choosing section are not recommended as the stop position of the subject moving body.

5. The signal processing apparatus according to claim 1, wherein the free space information includes information representing a position and orientation of a moving body already stopped in the free space, and the circuitry is further configured to set the stop position candidates depending on the position and orientation of the moving body already stopped in the free space.

6. The signal processing apparatus according to claim 5, wherein the circuitry is further configured to set the stop position candidates which are arranged in parallel with the orientation of the moving body already stopped in the free space.

7. The signal processing apparatus according to claim 1, wherein the circuitry is further configured to choose the recommended stop position based on preference information regarding a user.

8. The signal processing apparatus according to claim 7, wherein the preference information represents a preference of the user about at least either a size of a space around the subject moving body or a moving path of the user to a facility associated with the free space.

9. The signal processing apparatus according to claim 1, wherein the circuitry is further configured to communicate with a server that manages a moving body to be stopped in the free space, and set the stop position candidates based on management information acquired from the server.

10. The signal processing apparatus according to claim 9, wherein the management information includes at least either a size of a moving body stopped in the free space in a past time or preference information regarding a user of a moving body stopped in the free space in a past time.

11. The signal processing apparatus according to claim 9, wherein the management information includes at least either a size of a moving body to be stopped in the free space in a future time or preference information regarding a user of a moving body to be stopped in the free space in a future time.

12. The signal processing apparatus according to claim 9, wherein the circuitry is further configured to transmit, to the server, a size of the subject moving body and preference information regarding a user of the subject moving body, along with information representing a free space where the subject moving body is to be stopped in a future time.

13. The signal processing apparatus according to claim 1, wherein the circuitry is further configured to decide, as the stop position of the subject moving body, a position chosen by the user from the multiple stop position candidates.

14. The signal processing apparatus according to claim 1, wherein the circuitry is further configured to decide the recommended stop position as the stop position of the subject moving body.

15. The signal processing apparatus according to claim 2, wherein the circuitry is further configured to present a moving path to a position chosen by the user from the multiple stop position candidates.

16. The signal processing apparatus according to claim 1, wherein the circuitry is further configured to acquire the free space information based on an image acquired by capturing an image of a surrounding of the subject moving body.

17. A signal processing method comprising:

setting multiple stop position candidates as candidates of a stop position of a moving body in a free space around a subject moving body based on free space information related to the free space;

calculating an exit moving path for at least either a moving body already stopped in the free space or moving bodies to be stopped at the stop position candidates to exit from the free space;

deleting, from the multiple stop position candidates, a stop position candidate that is arranged on the exit moving path;

choosing a recommended stop position recommended as the stop position of the subject moving body from the remaining stop position candidates;

causing a display to display a stop position candidate that is not recommended based on the stop position candidate blocking an exit moving path; and controlling movement of the subject moving body to the recommended stop position based on a moving path calculated to the recommended stop position.

18. A non-transitory computer-readable recording medium having recorded thereon a program which, when executed by a computer, causes the computer to perform a method, the method comprising:

setting multiple stop position candidates as candidates of a stop position of a moving body in a free space around a subject moving body based on free space information related to the free space;

calculating an exit moving path for at least either a moving body already stopped in the free space or moving bodies to be stopped at the stop position candidates to exit from the free space;

deleting, from the multiple stop position candidates, a stop position candidate that is arranged on the exit moving path;

choosing a recommended stop position recommended as the stop position of the subject moving body from the remaining stop position candidates;

causing a display to display a stop position candidate that is not recommended based on the stop position candidate blocking an exit moving path; and controlling movement of the subject moving body to the recommended stop position based on a moving path calculated to the recommended stop position.

* * * * *